(12) United States Patent
Przybylski et al.

(10) Patent No.: US 10,120,375 B2
(45) Date of Patent: Nov. 6, 2018

(54) SYSTEMS AND METHODS FOR RETRAINING OUTLIER DETECTION LIMITS IN A BUILDING MANAGEMENT SYSTEM

(71) Applicant: Johnson Controls Technology Company, Holland, MI (US)

(72) Inventors: Andrew J. Przybylski, Franksville, WI (US); Michael J. Wenzel, Grafton, WI (US); Andrew J. Boettcher, Wauwatosa, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 632 days.

(21) Appl. No.: 14/694,660

(22) Filed: Apr. 23, 2015

(65) Prior Publication Data

US 2016/0313023 A1    Oct. 27, 2016

(51) Int. Cl.
*F24F 11/00*    (2018.01)
*G05B 23/02*    (2006.01)
*F24F 11/30*    (2018.01)
*F24F 110/20*   (2018.01)

(52) U.S. Cl.
CPC .......... *G05B 23/0297* (2013.01); *F24F 11/30* (2018.01); *F24F 2110/20* (2018.01); *G05B 2219/2614* (2013.01); *G05B 2219/32201* (2013.01)

(58) Field of Classification Search
CPC .................. G06N 99/005; G05B 15/02; G05B 2219/2642; G06Q 50/06; G06F 17/18; F24F 11/30; F24F 11/0009
USPC ........ 700/275, 276, 291; 702/179, 182, 183; 236/1
See application file for complete search history.

(56) References Cited

U.S. PATENT DOCUMENTS

| | | | |
|---|---|---|---|
| 6,223,544 B1 | 5/2001 | Seem | |
| 8,239,168 B2 | 8/2012 | House et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,731,724 B2 | 5/2014 | Drees et al. | |
| 8,788,097 B2 | 7/2014 | Drees et al. | |
| 9,026,473 B2 * | 5/2015 | Chassin ................ | G06Q 30/08 361/601 |
| 9,087,359 B2 * | 7/2015 | Chassin ................ | G06Q 30/08 |
| 9,129,337 B2 * | 9/2015 | Chassin ................ | G06Q 30/08 |

(Continued)

*Primary Examiner* — Roy Y Yi
*Assistant Examiner* — Jeffrey Aiello
(74) *Attorney, Agent, or Firm* — Foley & Lardner LLP

(57) ABSTRACT

A building management system (BMS) includes a controller that monitors performance values for a controlled process during a first time period relative to initial outlier detection limits and generates new outlier detection limits for the controlled process in response to a detected change in the controlled process during the first time period. The controller monitors the performance values relative to the new outlier detection limits during a second time period to detect outliers during the second time period. The controller calculates a confidence difference for an estimated confidence parameter based on a number of outliers detected using the new outlier detection limits during the second time period. The controller adjusts the new outlier detection limits in response to the confidence difference dropping below a threshold value.

19 Claims, 8 Drawing Sheets

(56) References Cited

U.S. PATENT DOCUMENTS

| | | | |
|---|---|---|---|
| 9,753,962 B2* | 9/2017 | Petschulat | G06F 17/30321 |
| 2010/0106332 A1* | 4/2010 | Chassin | G06Q 20/102 |
| | | | 700/278 |
| 2010/0325148 A1* | 12/2010 | Anderson | G06F 17/30551 |
| | | | 707/769 |
| 2012/0173456 A1* | 7/2012 | Hirl | G06Q 40/06 |
| | | | 705/36 R |
| 2012/0259583 A1 | 10/2012 | Noboa et al. | |
| 2014/0058572 A1* | 2/2014 | Stein | G06Q 50/06 |
| | | | 700/291 |
| 2016/0018835 A1* | 1/2016 | Gaasch | G05F 1/66 |
| | | | 700/291 |
| 2017/0192872 A1* | 7/2017 | Awad | G06F 11/3476 |

* cited by examiner

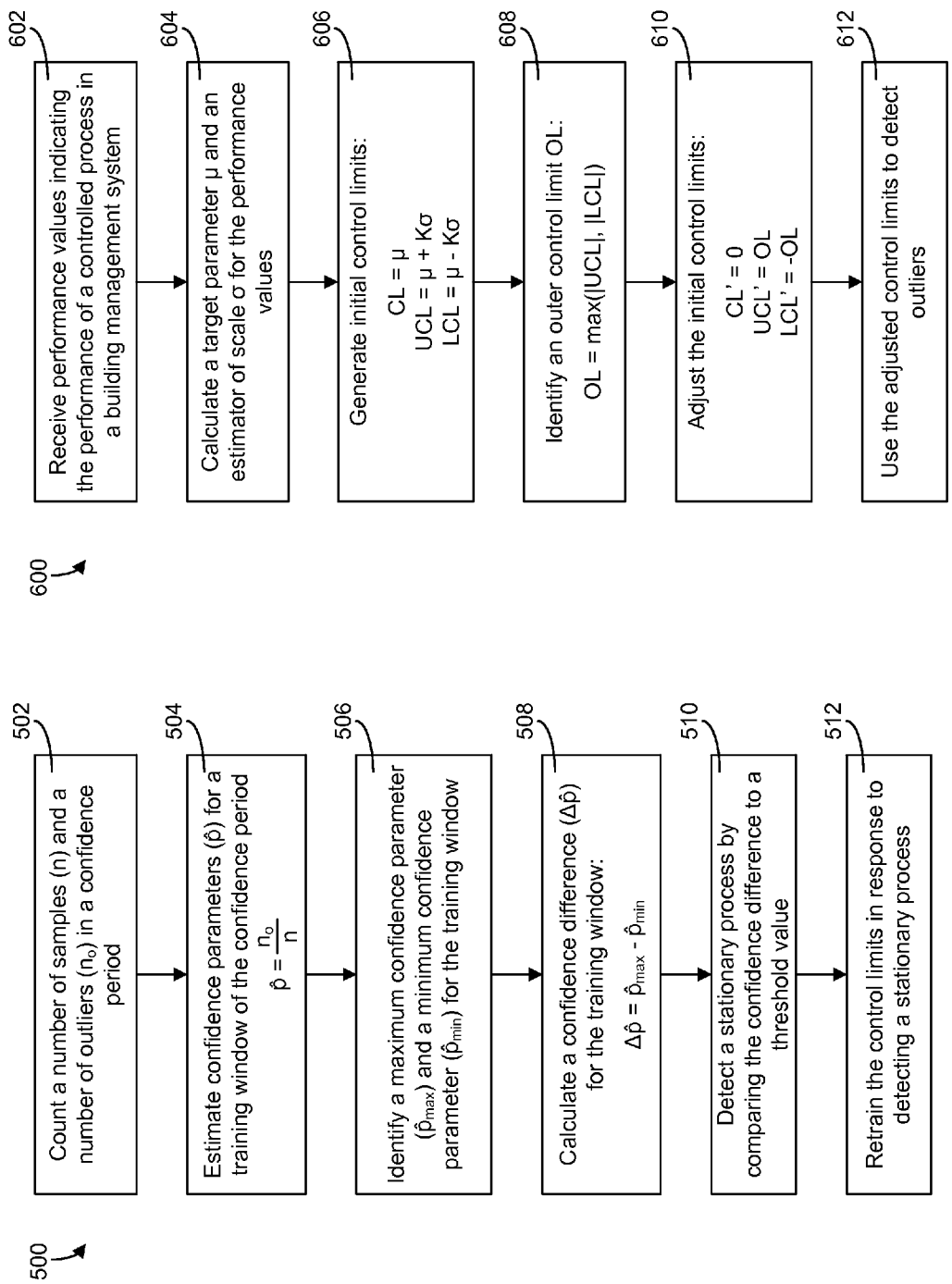

SYSTEMS AND METHODS FOR RETRAINING OUTLIER DETECTION LIMITS IN A BUILDING MANAGEMENT SYSTEM

BACKGROUND

The present invention relates generally to building management systems. The present invention relates more particularly to detecting outliers in time-series data in a building management system. The present invention relates more particularly still to systems and methods for retraining outlier detection limits used to detect outliers in time-series data in a building management system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

In HVAC systems, temporal (time-series) processes such as temperatures and flows exhibit statistical characteristics that provide information about how the system is performing in terms of error from its setpoint. These processes can be examined to expose when the system begins to degrade in performance to alert the user to repair a fault before it becomes more severe. For example, data from the temporal process can be compared to outlier detection limits to determine whether a statistically significant deviation from the setpoint has occurred. It can be difficult and challenging to determine appropriate outlier detection limits for various controlled processes.

SUMMARY

One implementation of the present disclosure is a building management system. The building management system includes one or more sensors that measure a variable state or condition representing an output of a controlled process in the building management system. The building management system further includes building equipment that operate to affect the variable state or condition measured by the one or more sensors and a controller in communication the building equipment and the one or more sensors. The controller monitors performance values for the controlled process during a first time period relative to initial outlier detection limits and generates new outlier detection limits for the controlled process in response to a detected change in the controlled process during the first time period. The controller monitors the performance values relative to the new outlier detection limits during a second time period to detect outliers during the second time period. The controller calculates a confidence difference for an estimated confidence parameter based on a number of outliers detected using the new outlier detection limits during the second time period. The controller adjusts the new outlier detection limits in response to the confidence difference dropping below a threshold value.

In some embodiments, calculating the confidence difference includes generating an estimated confidence parameter for each of the performance values observed during the second time period, identifying a maximum and a minimum of the generated confidence parameters, and calculating the confidence difference by subtracting the minimum confidence parameter from the maximum confidence parameter. In some embodiments, the confidence parameter is a ratio of a number of outliers detected during the second time period to a number of the performance values observed during the second time period.

In some embodiments, in response to detecting the change in the controlled process, the controller resets the confidence difference and discards any performance values used to calculate the confidence difference prior to the detected change.

In some embodiments, adjusting the new outlier detection limits includes identifying a reference time at which the confidence difference drops below a first threshold value, storing the confidence difference at the reference time as a reference confidence difference, and adjusting the new outlier detection limits in response to the confidence difference dropping below a second threshold value. The second threshold value may be a function of the reference confidence difference.

In some embodiments, adjusting the new outlier detection limits includes identifying a reference time at which the confidence difference drops below a first threshold value, storing the outlier detection limits at the reference time as reference outlier detection limits, and maintaining the new outlier detection within a widened set of outlier detection limits based on the reference outlier detection limits.

In some embodiments, the performance values are process errors based on a difference between the output of the controlled process and a setpoint for the controlled process. In some embodiments, the performance values are exponentially-weighted moving averages of the process error.

In some embodiments, monitoring the performance values during the first time period includes detecting outliers during the first time period using the initial outlier detection limits and detecting the change in the controlled process in response to a number of outliers detected during the first time period exceeding a threshold number of outliers. In some embodiments, the controller calculates the threshold number of outliers as a function of the confidence difference.

In some embodiments, monitoring the performance values during the first time period includes determining a current variance of the performance values during the first time period, determining a previous variance of the performance values during a previous time period prior to the first time period, and using the current variance of the performance values and the previous variance of the performance values to detect the change in the controlled process.

In some embodiments, detecting the change in the controlled process includes using the current variance of the performance values and the previous variance of the performance values to generate a test statistic, comparing the test statistic with a critical value, and detecting the change in the controlled process in response to the critical value exceeding the test statistic.

Another implementation of the present disclosure is controller in a building management system. The controller includes a communications interface that receives performance values indicating the performance of a controlled process in the building management system. The controller includes an outlier detector that monitors performance values for the controlled process during a first time period relative to initial outlier detection limits. The controller further includes a control limit trainer that generates new outlier detection limits in response to a detected change in the controlled process during the first time period. The outlier detector monitors the performance values relative to the new outlier detection limits during a second time period to detect outliers during the second time period. The controller further includes a confidence difference calculator that calculates a confidence difference for an estimated confidence parameter based on a number of outliers detected using the new outlier detection limits during the second time period. The controller further includes a stationary process detector that detects when the confidence difference drops below a threshold value during the second time period. The control limit trainer adjusts the new outlier detection limits in response to the confidence difference dropping below the threshold value.

In some embodiments, the confidence difference calculator generates an estimated confidence parameter for each of the performance values observed during the second time period. The confidence parameter may be a ratio of a number of outliers detected during the second time period to a number of the performance values observed during the second time period. The confidence difference calculator may identify a maximum and a minimum of the generated confidence parameters and calculate the confidence difference by subtracting the minimum confidence parameter from the maximum confidence parameter.

In some embodiments, the outlier detector detects outliers during the first time period using the initial outlier detection limits. The controller may further include a process change detector that detects the change in the controlled process in response to a number of outliers detected during the first time period exceeding a threshold number of outliers.

In some embodiments, the controller includes a lower variance detector that determines a current variance of the performance values during the first time period and determines a previous variance of the performance values during a previous time period prior to the first time period. The controller may further include a process change detector that uses the current variance of the performance values and the previous variance of the performance values to detect the change in the controlled process.

In some embodiments, the lower variance detector uses the current variance of the performance values and the previous variance of the performance values to generate a test statistic, compares the test statistic with a critical value, and identifies a lower variance event in response to the critical value exceeding the test statistic. The process change detector may detect the change in the controlled process in response to the lower variance event.

In some embodiments, the performance values are exponentially-weighted moving averages of a process error. The process error may be a difference between the output of the controlled process and a setpoint for the controlled process.

In some embodiments, in response to detecting the change in the controlled process, the confidence difference calculator resets the confidence difference and discards any performance values used to calculate the confidence difference prior to the detected change.

In some embodiments, adjusting the new outlier detection limits includes identifying a reference time at which the confidence difference drops below the threshold value, storing the outlier detection limits at the reference time as reference outlier detection limits, and maintaining the new outlier detection within a widened set of outlier detection limits based on the reference outlier detection limits.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5 is a flowchart of a process for detecting that the controlled system or process has stabilized using confidence differences of a confidence parameter, according to an exemplary embodiment.

FIG. 6 is a flowchart of a process for retraining control limits in response to a detected change in a controlled system or process or a determination that the controlled system or process has stabilized, according to an exemplary embodiment.

DETAILED DESCRIPTION

Figure 1A:
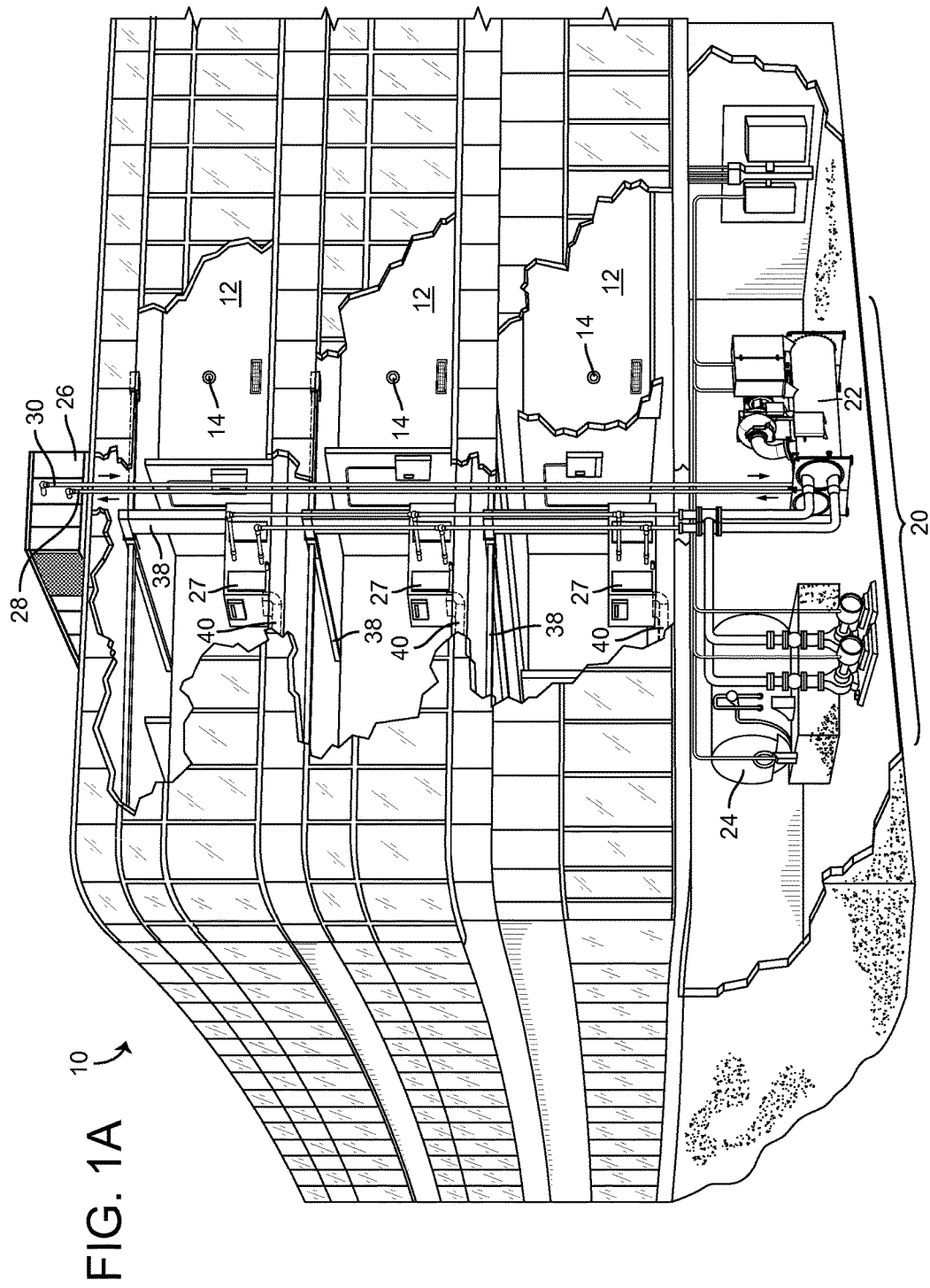
FIG. 1A is a drawing of a building equipped with a heating, ventilating, or air conditioning (HVAC) system, according to an exemplary embodiment.

Referring generally to the FIGURES, systems and methods for retraining outlier detection limits in a building management system are shown, according to various exemplary embodiments. A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof.

The BMS described herein is configured to operate HVAC equipment using various controlled processes (e.g., a temperature control process, a humidity control process, a flow control process, etc.) to achieve setpoint conditions within the building. The BMS receives feedback from one or more sensors configured to measure a variable state or condition affected by the HVAC equipment (e.g., temperature, humidity, etc.). The sensor measurements represent an output of the controlled process and can be used by the BMS to determine a process error (i.e., a difference between the setpoint and the output of the controlled process).

Outlier detection limits (also referred to as control limits) are used by the BMS to detect faults in the controlled process. Throughout this disclosure, the terms "outlier detection limits" and "control limits" are used interchangeably. Performance values for the controlled process (e.g., an exponentially-weighted moving average (EWMA) of the process error) are compared to the control limits. If a performance value lies outside the control limits, the performance value is classified as an outlier. A fault in the controlled process is detected if the number of outliers within a predetermined time period exceeds a threshold number of outliers.

The systems and methods described herein automatically detect changes in the controlled process and adjust (i.e., retrain) the control limits in response to such changes. Advantageously, the control limits may be retrained in response to both (1) changes which cause the controlled process to become non-stationary (e.g., a shift in the process mean, an increase in the standard deviation or variance of the process, etc.) and (2) changes which cause the controlled process to stabilize or become stationary after a non-stationary period. This advantage enables the control limits to be automatically retrained in response to a decrease in process variance and allows outliers to be detected with greater accuracy and sensitivity once the controlled process has stabilized.

Changes in the controlled process may be detected using a "confidence difference" for an estimated confidence parameter $\hat{p}$. The estimated confidence parameter $\hat{p}$ may be defined as the ratio of the number of outliers $n_o$ detected within a particular time period to the total number of samples n of the performance values observed during the same time period $$\left(\text{i.e., } \hat{p} = \frac{n_o}{n}\right).$$

The time period used to calculate the confidence parameter $\hat{p}$ is referred to herein as a "confidence period." The estimated confidence parameter $\hat{p}$ may be updated each time a new performance value sample is observed during the confidence period. As more samples are observed (i.e., the total number of samples n increases), the estimated confidence parameter $\hat{p}$ decreases hyperbolically. Large values of $\hat{p}$ indicate poor confidence whereas small values of $\hat{p}$ indicate high confidence. The confidence difference may be defined as the difference between the maximum of the estimated confidence parameters $\hat{p}_{max}$ and a minimum of the estimated confidence parameters $\hat{p}_{min}$ within a predetermined window of time referred to herein as a "training window." In some embodiments, each training window has a duration of one day and the active training window shifts forward in time in one day increments with each new day.

The confidence parameters $\hat{p}$ and the confidence difference $\hat{p}_{max}-\hat{p}_{min}$ can be used in several different ways to detect changes in the controlled process. For example, the maximum confidence parameter $\hat{p}_{max}$ within a training window may represent the maximum expected outlier occurrence rate within the training window and can be used to calculate the threshold number of outliers that will trigger a fault if exceeded. When the number of samples n is low, the value of $\hat{p}_{max}$ will be high. A high value for $\hat{p}_{max}$ indicates that the confidence is poor and may result in a high threshold number of outliers. This eliminates the need for complex sampling size handling and dynamically adjusts the sensitivity to declare faults based on the number of samples. This is a useful relationship to prevent faults that are not statistically significant based on a low number of samples. Additionally, the confidence difference $\hat{p}_{max}-\hat{p}_{min}$ can be compared to a threshold to determine whether the process has settled or has changed by a predetermined amount relative to a previous training window.

Advantageously, the systems and methods of the present invention allow the control limits to be automatically widened and narrowed via retraining in response to various events. For example, the control limits may be retrained in response to both detected "fault events" and "lower variance events." As described above, a fault event may be detected when the number of outliers within a particular time period exceeds a threshold number of outliers. A lower variance event may be detected using statistical hypothesis testing to compare a variance of the controlled process during a current time period to a variance of the controlled process during a previous time period. For example, the current process variance and the previous process variance may be used to calculate a test statistic. If the test statistic is less than a critical value, a lower variance event may be detected. A lower variance event indicates that the process has stabilized (i.e., the current variance is significantly less than the previous variance) and may trigger a retraining of the control limits.

The retraining performed in response to both fault events and lower variance events is described throughout this disclosure as a "coarse retraining" of the control limits. When a coarse retraining is performed, the confidence period may be reset along with the number of samples n and outliers $n_o$ used to calculate the confidence parameter $\hat{p}$. This causes the confidence parameter $\hat{p}$ and the confidence difference to increase immediately following the coarse retraining (due to the lower number of samples n) and then asymptotically decrease as time elapses.

The control limits may also be adjusted via "fine-tuning" once the process has settled. For example, a component of the BMS may monitor the confidence difference following a coarse retraining to determine when the confidence difference drops below a first threshold value (e.g., 0.1). The time at which the confidence difference drops below the first threshold value is referred to throughout this disclosure as the "reference time." The values of control limits at the reference time may be stored as "reference control limits."

The BMS may continue to monitor the confidence difference following the reference time to determine when the confidence difference drops below a second threshold value (e.g., 5% of the first threshold value). When the confidence difference drops below the second threshold value, the control limits may be retrained (i.e., fine-tuned) to more precisely detect outliers in a stationary process. Unlike a coarse retraining, a fine-tuning does not reset the confidence period or the confidence parameter $\hat{p}$. The control limits may be periodically adjusted via fine-tuning until the next coarse retraining. However, the control limits may be prevented from widening past 110% of the reference control limits via fine-tuning. A coarse retraining may be performed to adjust the control limits past this threshold. These and other features of the present invention are described in greater detail below.

Referring now to FIG. 1A, a perspective view of a building 10 is shown. Building 10 is serviced by HVAC system 20. HVAC system 20 is shown to include a chiller 22, a boiler 24, and a rooftop air handling unit (AHU) 26. HVAC system 20 uses a fluid circulation system to provide heating and/or cooling for building 10. The circulated fluid (e.g., water, glycol, etc.) may be cooled in chiller 22 or heated in boiler 24, depending on whether cooling or heating is required. Boiler 24 may add heat to the circulated fluid, for example, by burning a combustible material (e.g., natural gas). Chiller 22 may place the circulated fluid in a heat exchange relationship with another fluid (e.g., a refrigerant) in a heat exchanger (e.g., an evaporator) to absorb heat from the circulated fluid. The circulated fluid from chiller 22 or boiler 24 may be transported to AHU 26 via piping 28.

AHU 26 may place the circulated fluid in a heat exchange relationship with an airflow passing through AHU 26 (e.g., via one or more stages of cooling coils and/or heating coils). The airflow may be outside air, return air from within building 10, or a combination of both. AHU 26 may transfer heat between the airflow and the circulated fluid to provide heating or cooling for the airflow. For example, AHU 26 may include one or more fans or blowers configured to pass the airflow through a heat exchanger containing the circulated fluid and to deliver the heated or cooled airflow to building 10. The circulated fluid may then return to chiller 22 or boiler 24 via piping 30. In some embodiments, AHU 26 includes one or more humidity control devices (e.g., humidifiers, dehumidifiers, desiccant wheels, etc.) configured to control a humidity level of the airflow. The humidity control devices may add or remove humidity to the airflow to achieve setpoint humidity conditions within building 10.

The airflow supplied by AHU 26 (i.e., the supply airflow) may be delivered to building 10 via an air distribution system including air supply ducts 38 and may return to AHU 26 from building 10 via air return ducts 40. In some embodiments, building 10 includes a plurality variable air volume (VAV) units 27. VAV units 27 may include dampers or other flow control elements which can be operated to control an amount of the supply airflow provided to each of building zones 12. In other embodiments, AHU 26 delivers the supply airflow into building zones 12 (e.g., via supply ducts 38) without requiring intermediate flow control elements. In FIG. 1, building 10 is shown to include three building zones 12; however, it should be understood that building 10 may include any number of discrete or interconnected zones in various other implementations.

AHU 26 may include one or more sensors (e.g., temperature sensors, pressure sensors, humidity sensors, etc.) configured to measure attributes of the supply airflow. AHU 26 may also receive input from sensors and/or zone controllers 14 located within building zones 12. In some embodiments, zone controllers 14 are wall-mounted control units configured to measure and/or control a variable state or condition (e.g., temperature, humidity, air pressure, etc.) within building zones 12. For example, zone controllers 14 may be wall-mounted thermostats and/or humidistats configured to measure and control the temperature and/or humidity of building zones 12. HVAC system 20 may adjust the flow rate, temperature, humidity, or other attributes of the supply airflow through AHU 26 to achieve the setpoint conditions for building zones 12.

Figure 1B:
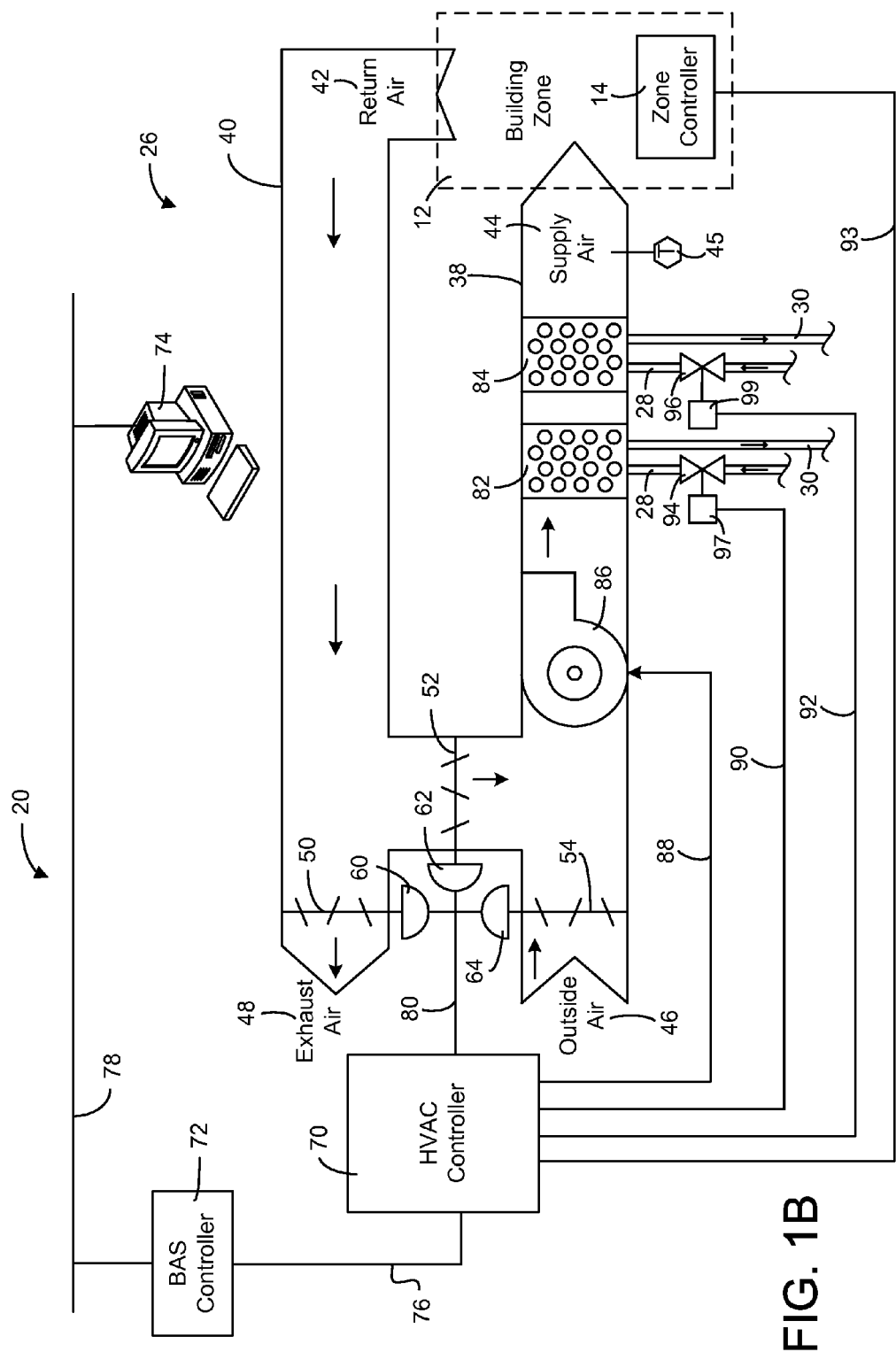
FIG. 1B is a schematic illustrating a portion of the HVAC system of FIG. 1A in greater detail, according to an exemplary embodiment.

Referring now to FIG. 1B, a block diagram illustrating a portion of HVAC system 20 in greater detail is shown, according to an exemplary embodiment. In FIG. 1B, AHU 26 is shown as an economizer-type air handling unit. Economizer-type air handling units vary the amount of outside air and return air used by the air handling unit for heating or cooling. For example, AHU 26 may receive return air 42 from building zone 12 via return air duct 40 and may deliver supply air 44 to building zone 12 via supply air duct 38. In some embodiments, AHU 26 is a rooftop unit and may be located on the roof of building 10 (e.g., as shown in FIG. 1A) or otherwise positioned to receive return air 42 and outside air 46. AHU 26 may be configured to operate exhaust air damper 50, mixing damper 52, and outside air damper 54 to control an amount of outside air 46 and return air 42 that combine to form supply air 44. Any return air 42 that does not pass through mixing damper 52 may be exhausted from AHU 26 through exhaust damper 50 as exhaust air 48.

Each of dampers 50-54 may be operated by an actuator. For example, exhaust air damper 50 may be operated by actuator 60, mixing damper 52 may be operated by actuator 62, and outside air damper 54 may be operated by actuator 64, as shown in FIG. 1B. Actuators 60-64 may communicate with a HVAC controller 70 via a communications link 80. Actuators 60-64 may receive control signals from HVAC controller 70 and may provide feedback signals to HVAC controller 70. Feedback signals may include, for example, an indication of a current actuator or damper position, an amount of torque or force exerted by the actuator, diagnostic information (e.g., results of diagnostic tests performed by actuators 60-64), status information, commissioning information, configuration settings, calibration data, and/or other types of information or data that may be collected, stored, or used by actuators 60-64. HVAC controller 70 may be an economizer controller configured to use one or more control algorithms (e.g., state-based algorithms, extremum-seeking control algorithms, PID control algorithms, model predictive control algorithms, feedback control algorithms, etc.) to control actuators 60-64.

Still referring to FIG. 1B, AHU 26 is shown to include a cooling coil 82, a heating coil 84, and a fan 86 positioned within supply air duct 38. In some embodiments, AHU 26 also includes one or more humidity control devices (e.g., humidifiers, dehumidifiers, desiccant wheels, etc.) positioned within supply air duct 38. Fan 86 may be configured to force supply air 44 through cooling coil 82, heating coil 84, and/or the humidity control devices and provide supply air 44 to building zone 12. HVAC controller 70 may communicate with fan 86 via communications link 88 to control a flow rate of supply air 44. In some embodiments, HVAC controller 70 controls an amount of heating or cooling applied to supply air 44 by modulating a speed of fan 86.

Cooling coil 82 may receive a chilled fluid from chiller 22 via piping 28 and may return the chilled fluid to chiller 22 via piping 30. Valve 94 may be positioned along piping 28 or piping 30 to control an amount of the chilled fluid provided to cooling coil 82. In some embodiments, cooling coil 82 includes multiple stages of cooling coils that can be independently activated and deactivated (e.g., by HVAC controller 70) to modulate an amount of cooling applied to supply air 44. Similarly, heating coil 84 may receive a heated fluid from boiler 24 via piping 28 and may return the heated fluid to boiler 24 via piping 30. Valve 96 may be positioned along piping 28 or piping 30 to control an amount of the heated fluid provided to heating coil 84. In some embodiments, heating coil 84 includes multiple stages of heating coils that can be independently activated and deactivated to modulate an amount of heating applied to supply air 44.

Each of valves 94-96 may be controlled by an actuator. In the embodiment shown in FIG. 1B, valve 94 is controlled by actuator 97 and valve 96 is controlled by actuator 99. Actuators 97-99 may communicate with HVAC controller 70 via communications links 90-92. Actuators 97-99 may receive control signals from HVAC controller 70 and may provide feedback signals to controller 70. HVAC controller 70 may receive a measurement of the supply air temperature from a temperature sensor 45 positioned in supply air duct

38 (e.g., downstream of cooling coil 82 and/or heating coil 84). In some embodiments, HVAC controller 70 also receives a measurement of the supply air humidity from a humidity sensor positioned in supply air duct 38.

In some embodiments, HVAC controller 70 operates valves 94-96 via actuators 97-99 to modulate an amount of heating or cooling provided to supply air 44 (e.g., to achieve a setpoint temperature for supply air 44 or to maintain the temperature of supply air 102 within a setpoint temperature range). The positions of valves 97-99 affect the amount of heating or cooling provided to supply air 44 by cooling coil 82 or heating coil 84 and may correlate with the amount of energy consumed to achieve a desired supply air temperature. AHU 70 may control the temperature of supply air 44 and/or building zone 12 by activating or deactivating coils 82-84, adjusting a speed of fan 86, or a combination of both.

HVAC controller 70 may communicate with a zone controller 14 (e.g., one of zone controllers 14) located within building zone 12 via a communications link 93. Zone controller 14 may include an integrated temperature sensor, humidity sensor, lighting sensor, pressure sensor, and/or any other type of sensor configured to measure a variable state or condition (e.g., temperature, humidity, air pressure, lighting, etc.) within building zone 12. Zone controller 14 may include a user interface through which a user can view and/or adjust various control setpoints for building zone 12 (e.g., a temperature setpoint, a humidity setpoint, etc.).

Zone controller 14 may use any of a variety of control algorithms (e.g., state-based algorithms, extremum-seeking control algorithms, PID control algorithms, model predictive control algorithms, feedback control algorithms, etc.) to determine appropriate control outputs for the controllable devices of HVAC system 20 (e.g., chiller 22, boiler 24, valves 94-96, actuators 60-64, actuators 97-99, cooling coil 82, heating coil 84, etc.) as a function of the measured zone conditions and/or the control setpoints. For example, one control output may be a function of the error (i.e., the difference) between a temperature setpoint and a measured zone temperature. In other embodiments, zone controller 14 reports the measured zone conditions, the control setpoints, and/or the error signals to HVAC controller 70 and AHU control 70 determines the appropriate control outputs for the controllable devices of HVAC system 20. In various embodiments, HVAC controller 70 and zone controller 14 may be separate (as shown in FIG. 1B) or integrated (e.g., for single-zone implementations such as a household thermostat). In an integrated implementation, HVAC controller 70 may be a software module configured for execution by a processor of zone controller 14.

Still referring to FIG. 1B, HVAC system 20 is shown to include a building automation system (BAS) controller 72 and a client device 74. BAS controller 72 may include one or more computer systems (e.g., servers, supervisory controllers, subsystem controllers, etc.) that serve as system level controllers, application or data servers, head nodes, master controllers, or field controllers for HVAC system 20. BAS controller 72 may communicate with multiple downstream building systems or subsystems (e.g., an HVAC system, a security system, a lighting system, etc.) via a communications link 76 according to like or disparate protocols (e.g., LON, BACnet, etc.). BAS controller 72 is described in greater detail with reference to FIG. 2.

In some embodiments, HVAC controller 70 receives information (e.g., commands, setpoints, operating boundaries, etc.) from BAS controller 72. For example, BAS controller 72 may provide HVAC controller 70 with a high fan speed limit and a low fan speed limit. A low limit may avoid frequent component and power taxing fan start-ups while a high limit may avoid operation near the mechanical or thermal limits of the fan system. In various embodiments, HVAC controller 70 and BAS controller 72 may be separate (as shown in FIG. 1B) or integrated. In an integrated implementation, HVAC controller 70 may be a software module configured for execution by a processor of BAS controller 72.

Client device 74 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 74 may be a computer workstation, a client terminal, a remote or local interface, or any other type of user interface device. Client device 74 may be a stationary terminal or a mobile device. For example, client device 74 may be a desktop computer, a computer server with a user interface, a laptop computer, a tablet, a smartphone, a PDA, or any other type of mobile or non-mobile device. Client device 74 may communicate with BAS controller 72, HVAC controller 70, and/or zone controller 14 via communications link 78.

Figure 2:
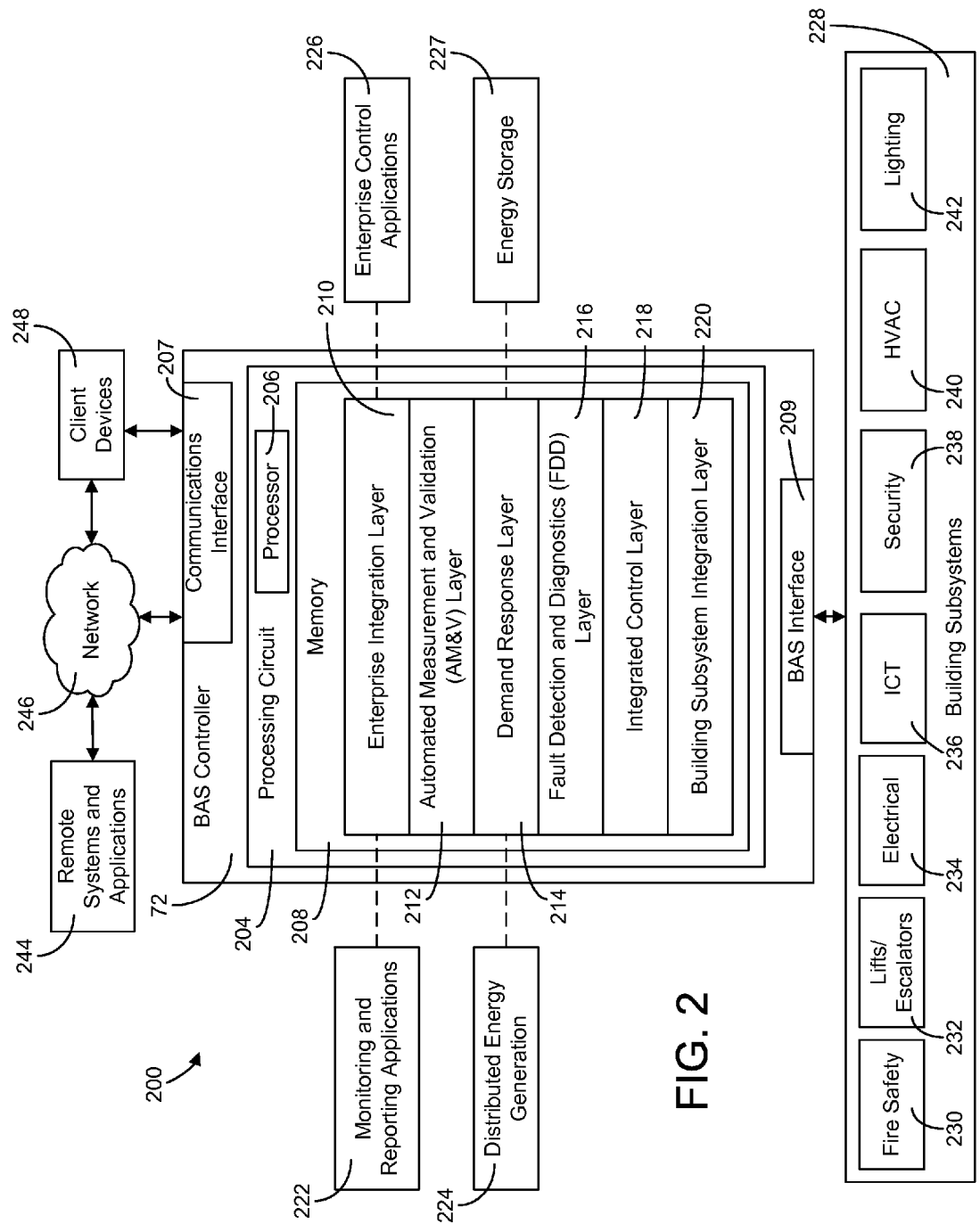
FIG. 2 is a block diagram of a building automation system (BAS) including a plurality of building subsystems and a BAS controller configured to monitor and control the building subsystems, according to an exemplary embodiment.

Referring now to FIG. 2, a block diagram of a building automation system (BAS) 200 is shown, according to an exemplary embodiment. BAS 200 may be implemented in building 10 to automatically monitor and control various building functions. BAS 200 is shown to include BAS controller 72 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 228 may include any number of devices, controllers, and connections for completing its individual functions and control activities. HVAC subsystem 240 may include many of the same components as HVAC system 20, as described with reference to FIGS. 1A-1B. For example, HVAC subsystem 240 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 may include any number of light fixtures, ballasts, lighting sensors, dimmers, or other devices configured to controllably adjust the amount of light provided to a building space. Security subsystem 238 may include occupancy sensors, video surveillance cameras, digital video recorders, video processing servers, intrusion detection devices, access control devices and servers, or other security-related devices.

Still referring to FIG. 2, BAS controller 72 is shown to include a communications interface 207 and a BAS interface 209. Interface 207 may facilitate communications between BAS controller 72 and external applications (e.g., monitoring and reporting applications 222, enterprise control applications 226, remote systems and applications 244, applications residing on client devices 248, etc.) for allowing user control, monitoring, and adjustment to BAS controller 72 and/or subsystems 228. Interface 207 may also facilitate communications between BAS controller 72 and client devices 248. BAS interface 209 may facilitate communications between BAS controller 72 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 may be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a WiFi transceiver for communicating via a wireless communications network. In another example, one or both of interfaces 207, 209 may include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 72 is shown to include a processing circuit 204 including a processor 206 and memory 208. Processing circuit 204 may be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 208 may be or include volatile memory or non-volatile memory. Memory 208 may include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In an exemplary embodiment, BAS controller 72 is integrated within a single computer (e.g., one server, one housing, etc.). In various other exemplary embodiments BAS controller 72 can be distributed across multiple servers or computers (e.g., that can exist in distributed locations). Further, while FIG. 2 shows applications 222 and 226 as existing outside of BAS controller 72, in some embodiments, applications 222 and 226 may be hosted within BAS controller 72 (e.g., within a memory device).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 may be configured to receive inputs from building subsystems 228 and other data sources, determine optimal control actions for building subsystems 228 based on the inputs, generate control signals based on the optimal control actions, and provide the generated control signals to building subsystems 228. The following paragraphs describe some of the general functions performed by each of layers 210-220 in BAS 200.

Enterprise integration layer 210 may be configured to serve clients or local applications with information and services to support a variety of enterprise-level applications. For example, enterprise control applications 226 may be configured to provide subsystem-spanning control to a graphical user interface (GUI) or to any number of enterprise-level business applications (e.g., accounting systems, user identification systems, etc.). Enterprise control applications 226 may also or alternatively be configured to provide configuration GUIs for configuring BAS controller 72. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 may be configured to manage communications between BAS controller 72 and building subsystems 228. For example, building subsystem integration layer 220 may receive sensor data and input signals from building subsystems 228 and provide output data and control signals to building subsystems 228. Building subsystem integration layer 220 may also be configured to manage communications between building subsystems 228. Building subsystem integration layer 220 translate communications (e.g., sensor data, input signals, output signals, etc.) across a plurality of multi-vendor/multi-protocol systems.

Demand response layer 214 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 224, from energy storage 227, or from other sources. Demand response layer 214 may receive inputs from other layers of BAS controller 72 (e.g., building subsystem integration layer 220, integrated control layer 218, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 may also include control logic configured to determine when to utilize stored energy. For example, demand response layer 214 may determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models may be used to predict various performance metrics such as power or efficiency for building equipment.

Demand response layer 214 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 may be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 may be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 may be configured to enhance the effectiveness of demand response layer 214 by enabling building subsystems 228 and their respective control loops to be controlled in coordination with demand response layer 214. This configuration may advantageously reduce disruptive demand response behavior relative to conventional systems. For example, integrated control layer 218 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 may be configured to provide feedback to demand response layer 214 so that demand response layer 214 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 may be configured to provide calculated inputs (e.g., aggregations) to these higher levels based on outputs from more than one building subsystem.

Automated measurement and validation (AM&V) layer 212 may be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 may be based on building system energy models and/or equipment models for individual BAS devices or subsystems. For example, AM&V layer 212 may compare a model-predicted output with an actual output from building subsystems 228 to determine an accuracy of the model.

Fault detection and diagnostics (FDD) layer 216 may be configured to provide on-going fault detection for building subsystems 228, building subsystem devices (i.e., building equipment), and control algorithms used by demand response layer 214 and integrated control layer 218. FDD layer 216 may receive data inputs from integrated control layer 218, directly from one or more building subsystems or devices, or from another data source. FDD layer 216 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 216 may be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) may shut-down systems or direct control activities around faulty devices or systems to reduce energy waste, extend equipment life, or assure proper control response.

FDD layer 216 may be configured to store or access a variety of different system data stores (or data points for live data). FDD layer 216 may use some content of the data stores to identify faults at the equipment level (e.g., specific chiller, specific AHU, specific terminal unit, etc.) and other content to identify faults at component or subsystem levels. For example, building subsystems 228 may generate temporal (i.e., time-series) data indicating the performance of BAS 200 and the various components thereof. The data generated by building subsystems 228 may include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alert a user to repair the fault before it becomes more severe.

FDD layer 216 may use any of a variety of fault detection techniques. In some embodiments, FDD layer 216 detects faults by comparing measured or calculated values from building subsystems 228 to one or more outlier detection limits. For example, FDD layer 216 may determine whether an error data point from HVAC subsystem 240 (e.g., a difference between a measured temperature and a temperature setpoint) or a function of the error (e.g., an exponentially-weighted moving average (EWMA) of the error) is within a range of values defined by outlier detection limits. If the error is outside the outlier detection limits, FDD layer 216 may identify the data point as an outlier. If a threshold number of outliers are detected within a predetermined time period, FDD layer 216 may determine that a fault has occurred. In other embodiments, FDD layer 216 may be use a statistical analysis of equipment model coefficients to identify faults in equipment operation. FDD layer 216 may utilize pattern recognition methods, pattern classification methods, rule-based classification methods, outlier analyses, statistical quality control charting techniques, or the like to conduct the statistical analysis. FDD layer 216 is described in greater detail with reference to FIG. 3.

Figure 3:
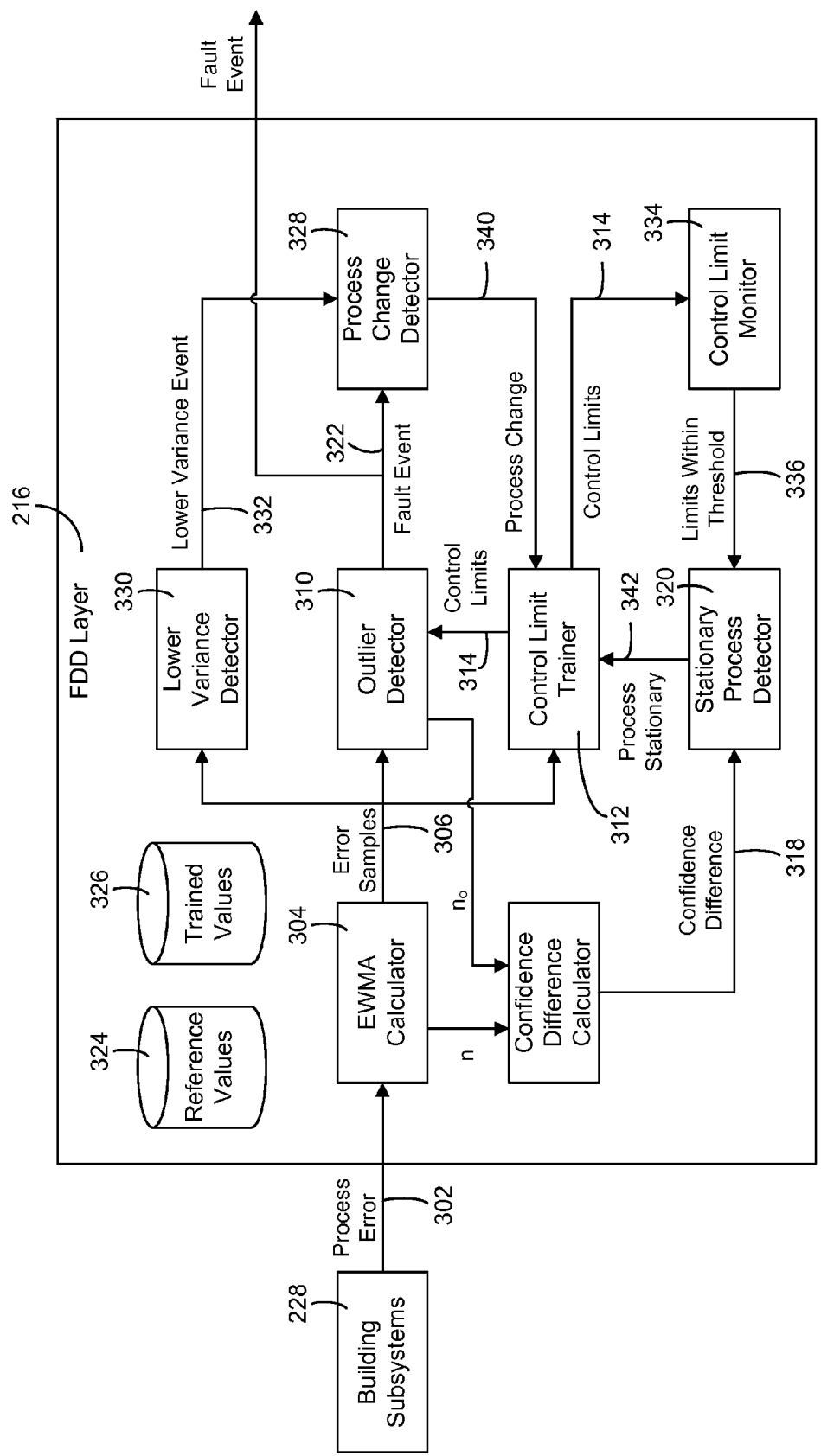
FIG. 3 is a block diagram illustrating a fault detection and diagnostics (FDD) layer of the BAS controller of FIG. 2 in greater detail, according to an exemplary embodiment.

Referring now to FIG. 3, a block diagram illustrating FDD layer 216 in greater detail is shown, according to an exemplary embodiment. FDD layer 216 is shown receiving a process error 302 from building subsystems 228. Process error 302 may represent a difference between a setpoint r for a controlled process (e.g., a temperature control process, a humidity control process, a flow control process, etc.) and a measured or calculated value x for the controlled process. The measured or calculated value x may be measured by any of a variety of sensors of building subsystems 228 or calculated based on one or more measured values. For example, the value x may be a measured temperature, a measured humidity, a measured flow rate, a measured or calculated energy consumption, etc. Process error 302 may be calculated by subtracting the measured or calculated value x from the setpoint r (i.e., e=r−x, where e is the process error). FDD layer 216 may compare process error 302 (or a function of process error 302) to one or more outlier detection limits (i.e., control limits) to detect faults in the controlled process using an outlier-based detection technique, as described with reference to FIG. 2. Throughout this disclosure, the terms "outlier detection limits" and "control limits" are used interchangeably.

Advantageously, FDD layer 216 may be configured to adaptively retrain the control limits used in the outlier detection process in response to various events, thereby improving the accuracy and reliability of the outlier-based detection technique. In brief overview, the retraining may be based on a confidence difference for a confidence parameter $\hat{p}$. In some embodiments, the confidence parameter $\hat{p}$ is a Bernoulli parameter and may be defined as the ratio of the number of detected outliers $n_o$ to the number of samples n $$\left(\text{i.e., } \hat{p} = \frac{n_o}{n}\right).$$

In various other embodiments, the confidence parameter $\hat{p}$ may be any other metric that describes the number of outliers $n_o$ and/or the number of samples n. As more samples are provided, the confidence parameter $\hat{p}$ may decrease hyperbolically. The confidence difference may be defined as the difference between the maximum confidence parameter $\hat{p}_{max}$ and the minimum confidence parameter $\hat{p}_{min}$ for a particular time period.

In some embodiments, FDD layer 216 retrains the control limits in response to detected fault events. A fault event may be detected when the number of outliers within a training window exceeds a threshold number of outliers. The maximum confidence value $\hat{p}_{max}$ may represent the probability of an outlier occurring and may be used to define the threshold number of outliers. A large value for $\hat{p}_{max}$ indicates that the confidence is poor and results in a high threshold number of outliers. This is a useful relationship to prevent faults that are not statistically significant based on the number of samples. Advantageously, this feature eliminates the need for complex sampling size handling and dynamically adjusts the sensitivity to declare faults as a function of the confidence parameters $\hat{p}$.

In some embodiments, FDD layer 216 retrains the control limits in response to lower variance events. Lower variance events may be used to identify when the variance of the controlled process has decreased relative to a previous training window. For example, FDD layer 216 may use a left-tail two-sample F-test to detect a change in variance. Both fault events and lower variance events may signify a change in the controlled process and may trigger FDD layer 216 to perform a "coarse" retraining of the control limits. When a coarse retraining is performed, the error samples collected before the retraining may be dropped to allow FDD layer 216 to quickly adapt to the changed process. When data is dropped, the confidence in the control limits will be poor immediately following the retraining. As more samples are provided, the confidence may improve (i.e., decrease numerically), which triggers FDD layer 216 to refine the control limits to become more sensitive to faults in the changed process. These and other features of FDD layer 216 are described in greater detail below.

Still referring to FIG. 3, FDD layer 216 is shown to include an exponentially-weighted moving average (EWMA) calculator 304. EWMA calculator 304 may be configured to calculate an EWMA or other average of the process error 302. In some embodiments, EWMA calculator 304 calculates a moving average of process error 302. In general, moving averages are a class of statistical metrics that utilize previously calculated averages in their computation. Moving averages may advantageously reduce processing times and memory requirements relative to other statistical processing strategies, since only a subset of the data values needs to be retained. For example, a standard average may be calculated using the formula:

$$avg_i = \frac{\sum_{i=1}^{n} x_i}{i}$$

where i is the number of data points and $x_i$ is the $i^{th}$ data point. A standard average requires summing the data points each time a new data point is collected and requires retaining each data point in memory. A moving average, by contrast, can use the previously calculated average to generate a new average when $x_{i+1}$ becomes available. For example, a moving average may be calculated using the formula:

$$\text{mov\_avg}_{i+1} = \frac{x_{i+1} + i * avg_i}{i+1}$$

where $x_{i+1}$ is the most recent data point and $avg_i$ is the previously computed average.

In some embodiments, EWMA calculator 304 calculates a weighted moving average of process error 302. Weighted moving averages are a subclass of moving averages that apply weightings to the various subsets of data. For example, a weighted moving average may weight more recent data values higher than older values. In this way, the weighted moving average provides a current metric on the underlying data. EWMAs utilize exponential weightings that can be used to give greater emphasis to more recent values. A variety of equations exist for calculating an EWMA. For example, an EWMA may be calculated according to the following function:

$$\bar{x}_t = \sum_{j=0}^{\infty} \lambda(1-\lambda)^j x_{t-j}$$

where $\bar{x}_t$ is the EWMA at time t, $\lambda$ is an exponential smoothing constant or filter value, and $x_{t-j}$ is the value of the signal at time t-j. EWMA calculator 304 may calculate the EWMA of process error 302 and output the calculated EWMA as error samples 306.

In various embodiments, error samples 306 may be an average of process error 302, a moving average of process error 302, an EWMA of process error 302, or any other function of process error 302. Outlier detector 310 may receive the error samples 306 from EWMA calculator 304 and compare the error samples 306 with the control limits 314 provided by control limit trainer 312 to determine whether any of the error samples 306 qualify as outliers. Outlier detector 310 may provide the number of detected outliers $n_o$ to confidence difference calculator 308 for use in calculating the confidence difference.

Still referring to FIG. 3, FDD layer 216 is shown to include a confidence difference calculator 308. Confidence difference calculator 308 is shown receiving the number n of error samples n from EWMA calculator 304 and the number $n_o$ of detected outliers from outlier detector 310. Confidence difference calculator 308 may be configured to calculate an estimated confidence parameter $\hat{p}$ based on the number $n_o$ of detected outliers and the number n of total samples. In some embodiments, the estimated confidence parameter $\hat{p}$ is a Bernoulli parameter calculated according to the following equation:

$$\hat{p} = \frac{n_o}{n}$$

where n is the total number of error samples 306 obtained during the current "confidence period" and $n_o$ is the number of outlier samples during the current confidence period. In various other embodiments, the estimated confidence parameter $\hat{p}$ may be any other metric describing the number $n_o$ of detected outliers and/or the number n of total samples.

In some embodiments, the confidence period begins when a coarse retraining of the control limits is performed and lasts until the next coarse retraining. Each time a new error sample 306 is obtained, a new value for the estimated confidence parameter $\hat{p}$ may be calculated. Each value of the estimated confidence parameter $\hat{p}$ may correspond to a particular moment in time. As time elapses during the confidence period, more error samples 306 are obtained (i.e., n increases) and the estimated confidence parameter $\hat{p}$ decreases hyperbolically. When a coarse retraining of the control limits is performed, the current confidence period ends and a new confidence period begins. When a new confidence period begins, the total number of samples n and outlier samples $n_o$ may be reset, which causes the estimated confidence parameter $\hat{p}$ to increase.

Confidence difference calculator 308 may be configured to calculate differences between the maximum confidence parameter $\hat{p}_{max}$ and the minimum confidence parameter $\hat{p}_{min}$ for various "training windows" within the confidence period. Each training window defines a set of data (e.g., error values, control limits, estimated confidence parameters $\hat{p}$, etc.) that correspond to the times within the training window. In some embodiments, the training window is a sliding window that moves forward in time as time elapses. When new data is added to the front of the training window, a corresponding amount of data may be removed from the back of the window such that the training window remains statically sized. In other embodiments, the training windows are non-overlapping. For example, each training window may have a duration of one day and the active training window may shift forward in time in one day increments with each new day. In various other embodiments, the training windows may have any other duration (e.g., days, hours, weeks, minutes, etc.) and may be statically sized or dynamically sized (e.g., growing as new data is added, growing up to a maximum size before shifting or sliding forward in time, etc.).

Confidence difference calculator 308 may identify a maximum confidence parameter $\hat{p}_{max}$ and a minimum confidence parameter $\hat{p}_{min}$ during each training window. Confidence difference calculator 308 may calculate the confidence difference for a training window by subtracting the minimum confidence parameter $\hat{p}_{min}$ for the training window from the maximum confidence parameter $\hat{p}_{max}$ for the training window (i.e., confidence difference=$\hat{p}_{max}-\hat{p}_{max}$). As mentioned above, the confidence parameter $\hat{p}$ may decrease hyperbolically with time, which causes the confidence difference to decrease with each successive training window until the end of the confidence period. Confidence difference calculator 308 may provide the calculated confidence differences 318 to stationary process detector 320 for use in determining whether the process has settled.

Confidence difference calculator 308 may also update the confidence difference 318 in trained values database 326 each time the control limits are retrained. Trained values database 326 stores the control limits currently being used by outlier detector 310 (i.e., the active control limits) as well as the confidence difference 318 for the training window used to establish the active control limits. In some embodiments, trained values database 326 stores the error samples 306 for the training window used to establish the active control limits and/or a sample variance based on such error samples.

Still referring to FIG. 3, FDD layer 216 is shown to include an outlier detector 310. Outlier detector 310 is shown receiving the error samples 306 from EWMA calculator 304 and the control limits 314 from control limit trainer 312. Outlier detector 310 may compare each error sample 306 with the current control limits 314 to determine whether the error sample 306 qualifies as an outlier. For example, if the error sample is within a range of values defined by the control limits, outlier detector 310 may determine that the error sample is not an outlier. However, if the error sample lies outside the range of values defined by the control limits, outlier detector 310 may determine that the error sample qualifies as an outlier.

Outlier detector 310 may be configured to generate fault event notifications 322 using the detected outliers. For example, outlier detector 310 may compare the number of outliers detected during each training window with a threshold number of outliers. If the number of outliers within a training window exceeds the threshold number of outliers, outlier detector 310 may generate and output a fault event notification 322. In some embodiments, the threshold number of outliers is training window-specific. For example, the threshold number of outliers may be a function of the maximum confidence parameter $\hat{p}_{max}$ for the training window.

In some embodiments, outlier detector 310 calculates the threshold number of outliers using an inverse binomial function $B^{-1}(\alpha, n, \hat{p}_{max})$. The function $B^{-1}(\alpha, n, \hat{p}_{max})$ may return the threshold number of outliers x (i.e., $x=B^{-1}(\alpha, n, \hat{p}_{max})$) such that the binomial cumulative distribution function $B_{cdf}$ of n error samples evaluated at x is at least α, given that each error sample has a probability $\hat{p}_{max}$ of being an outlier (i.e., $\alpha \leq B_{cdf}(x, n, \hat{p}_{max})$). In other words, the parameter α is the probability of observing x outliers in a sample size of n where each error sample has a probability $\hat{p}_{max}$ of being an outlier. The parameter α may be specified by a user, retrieved from memory, or automatically determined. The parameter n may be equal to the number of error samples in the training window. The parameter $\hat{p}_{max}$ may be determined as described with reference to confidence difference calculator 308. When the number of detected outliers within a training window exceeds the threshold number of outliers, outlier detector 310 may output a fault event notification 322 to process change detector 328 indicating that a change in the controlled process has occurred. Outlier detector 310 may also provide the fault event notification 322 to other components of BAS controller 72 or BAS 200 for external reporting and/or diagnostics.

Still referring to FIG. 3, FDD layer 216 is shown to include a lower variance detector 330. Lower variance detector 330 may be configured to detect lower variance events in the controlled process. Lower variance events occur when the variance of the error samples 306 in the current training window is significantly lower than the variance of the error samples 306 for a previous training window. In some embodiments, the previous training window is the training window used to establish the active control limits 314. Lower variance detector 330 may calculate the variance $S^2$ of the error samples in each training window using the equation:

$$S = \sqrt{\frac{1}{n-1} \sum_{i=1}^{n} [x(i)]^2}$$

where x is a vector containing the error samples 306 and n is the length of the vector. The result of this calculation S represents the standard deviation of the error samples 306 in the training window and can be squared to determine the variance $S^2$.

Lower variance detector 330 may use statistical hypothesis testing to determine whether the variance of the error samples 306 in the current training window is significantly lower than the variance of the error samples 306 for the previous training window. For example, lower variance detector 330 may formulate a left-tailed hypothesis test of the form:

$$H_0: S_{CurrentPeriod}^2 \geq S_{PreviousPeriod}^2$$

$$H_1: S_{CurrentPeriod}^2 < S_{PreviousPeriod}^2$$

where $H_0$ is the null hypothesis that the variance of the error samples 306 in the current training window (i.e., $S_{CurrentPeriod}^2$) is greater than or equal to the variance of the error samples 306 in the previous training window (i.e., $S_{PreviousPeriod}^2$) and $H_1$ is the tested hypothesis that the variance $S_{CurrentPeriod}^2$ is less than the variance $S_{PreviousPeriod}^2$.

Lower variance detector 330 may use a two-sample F-test for variance to calculate the test statistic $F_{STAT}$:

$$F_{STAT} = \frac{S_{CurrentPeriod}^2}{S_{PreviousPeriod}^2} \sim F_{V_1, V_2}$$

where the parameter $V_1$ indicates the degrees of freedom of the numerator (i.e., the number of samples in the current training window minus one) and the parameter $V_2$ indicates the degrees of freedom of the denominator (i.e., the number of samples in the previous training window minus one).

Lower variance detector 330 may generate a critical value $f_{crit}$ for the test statistic. In some embodiments, lower variance detector 330 generates the critical value $f_{crit}$ using an inverse cumulative distribution function for the test statistic $F_{STAT}$. For example, lower variance detector 330 may calculate the critical value $f_{crit}$ using the following equation:

$$f_{crit} = F_{V_1, V_2}^{-1}(1-\alpha)$$

where $F^{-1}$ is the inverse cumulative distribution function for the test statistic and the parameter α represents the probability of a false positive for the statistical hypothesis test (i.e., the probability of incorrectly rejecting the null hypothesis when in fact $S_{CurrentPeriod}^2 \geq S_{PreviousPeriod}^2$). Lower variance detector 330 may determine the parameter α by identifying an acceptable probability that the null hypothesis will be incorrectly rejected. In various embodiments, a value for the parameter α may be retrieved from memory, specified by a user, and/or calculated based on one or more stored values. In an exemplary embodiment, the value for the parameter α is approximately 0.001.

Lower variance detector 330 may compare the critical value $f_{crit}$ with the test statistic $F_{STAT}$ to determine whether to reject the null hypothesis. If the value of the test statistic is less than the critical value (i.e., $F_{STAT} < f_{crit}$), lower variance detector 330 may reject the null hypothesis and determine that a significant decrease in variance has occurred. However, if the value of the test statistic is not less than the critical value (i.e., $F_{STAT} \geq f_{crit}$), lower variance detector 330 may fail to reject the null hypothesis and may determine that a significant decrease in variance has not occurred. If the null hypothesis is rejected, lower variance detector 330 may generate and output a lower variance event notification 332 to process change detector 328 indicating that a lower variance event has occurred.

Still referring to FIG. 3, FDD layer 216 is shown to include a process change detector 328. Process change detector 328 may be configured to detect changes in the controlled process based on inputs received from outlier detector 310 and lower variance detector 330. In some embodiments, process change detector 328 determines that a change has occurred in response to receiving the fault event notification 322 from outlier detector 310 and/or the lower variance event notification 3332 from lower variance detector 330. The change in the process may be caused by outlier detections sufficient to trigger a fault event notification 322 and/or a decrease in the process variance sufficient to trigger a lower variance event notification 332. Advantageously, both fault events and lower variance events qualify as process changes that trigger a coarse retraining of the control limits. This functionality allows the control limits to be widened in response to fault events (e.g., to compensate for an increase in process variance and/or steady-state error) and subsequently narrowed in response to a decreased process variance (e.g., to provide more accurate outlier detection once the process has settled).

Upon determining that a change in the process has occurred, process change detector 328 may output a process change notification 340 to control limit trainer 312. The process change notification 340 may cause control limit trainer 312 to perform a coarse retraining of the control limits. The process change notification 340 may also reset the confidence period, which causes confidence difference calculator 308 to drop all of the data prior to the process change notification 340 (e.g., resetting the number of data points n and number of outliers $n_o$ used to calculate the confidence parameter $\hat{p}$). The calculated confidence difference 318 may increase immediately following the process change notification 340 due to the lesser number of data points used to calculate the confidence parameter $\hat{p}$ and then hyperbolically decrease as more data points are obtained.

Still referring to FIG. 3, FDD layer 216 is shown to include a control limit trainer 312. Control limit trainer 312 may be configured to generate and set the active control limits 314 used by outlier detector 310. The control limits generated by control limit trainer 312 may be based on the statistics of the underlying process. For example, control limit trainer 312 is shown receiving the error samples 306 from EWMA calculator 304. Control limit trainer 312 may use the error samples 306 for the current training window to calculate various statistics (e.g., mean, standard deviation, variance, etc.) characterizing the performance of the controlled process during the current training window.

Control limit trainer 312 may use the error samples 306 for the current training window to generate the following control limits:

$$UCL = \mu + K\sigma$$

$$LCL = \mu - K\sigma$$

$$CL = \mu$$

where UCL is defined as an upper control limit, LCL is a lower control limit, and CL is a center limit. The center limit CL may be equal to a target parameter $\mu$, which may be the mean of the error samples 306. The upper and lower control limits may be equal to the target parameter $\mu$ plus or minus a multiple K of an estimator of scale $\sigma$ for the controlled process. Estimators of scale generally provide a metric that describes how spread out a set of performance values is relative to the target parameter. In one embodiment, the standard deviation of the error samples 306 is used as the estimator of scale $\sigma$ and the multiplier K is approximately 2.8. Such a multiplier captures over 99% of the error samples 306 within the control limits UCL and LCL.

In other embodiments, a robust estimator of scale may be calculated based on the error samples 306 and used as the estimator of scale $\sigma$. Robust estimators of scale differ from standard estimators of scale, such as a standard deviation, by reducing the effects of outlying performance values. A variety of different types of robust estimators of scale may be used in conjunction with the present invention. For example, a robust estimator of scale that uses a pairwise difference approach may be used. Such approaches typically have a higher Gaussian efficiency than other robust approaches. These approaches provide a useful metric on the interpoint distances between elements of two arrays and can be used to compare a predicted behavior and an observed behavior in the building management system.

One robust estimator of scale may be defined as: $S_n = c_n * 1.1926 * \text{med}_i \{\text{med}_j(|x_i - x_j|)\}$ where the set of medians for $j=1, \ldots, n$ is first calculated as an inner operation. Next, the median of these results is calculated with respect to the i values. The median result is then multiplied by 1.1926, to provide consistency at normal distributions. A correction factor $c_n$ may also be applied and is typically defined as 1 if n is even. If n is odd, $c_n$ can be calculated as:

$$c_n = \frac{n}{n - 0.9}.$$

The estimator of scale $S_n$ has a Gaussian efficiency of approximately 58%. Computational techniques are also known that compute Sn in O(n log n) time.

In another exemplary embodiment, $Q_n$ may be used as a robust estimator of scale, where $Q_n$ is defined as $Q_n = d_n * 2.2219 * 1^{st}$ quartile($|x_i - x_j|:i<j$). As with $S_n$, a pairwise difference approach is taken to compute $Q_n$. If n is even, correction factor $d_n$ can be defined as:

$$d_n = \frac{n}{n + 1.4}$$

and if n is odd, correction factor $d_n$ can be defined as:

$$d_n = \frac{n}{n + 3.8}.$$

The estimator of scale $Q_n$ provides approximately an 82% Gaussian efficiency and can also be computed in O(n log n) time.

Control limit trainer 312 may modify the control limits UCL, LCL, and CL defined above to generate the control limits 314 used by outlier detector 310. In some embodiments, control limit trainer 312 sets the center limit CL equal to zero since the controlled process has the best performance at zero error. Control limit trainer 312 may determine an outer control limit OL, which is defined as the maximum of the absolute values of UCL and LCL (i.e., OL=max(|UCL|, |LCL|). Control limit trainer 312 may then redefine the control limits 314 as follows:

$$UCL' = OL$$

$$LCL' = -OL$$

$$CL' = 0$$

This ensures that the control limits 314 (i.e., UCL' and LCL') are centered around zero and that the control limits 314 allow the controlled process to move toward zero error without producing outliers.

Control limit trainer 312 is shown receiving the process change notification 340 from process change detector 328. Upon receiving the process change notification 340, control limit trainer 312 may retrain the control limits 314 (i.e., generate a new set of control limits) using the error samples 306 corresponding to the current training window. Retraining the control limits 314 in response to the process change notification 340 allows FDD layer 216 to compensate for coarse changes in the controlled process. Control limit trainer 312 may provide the retrained control limits 314 to outlier detector 310 for use in detecting outlier error samples. Control limit trainer 312 may also store the retrained control limits 314 trained values database 326.

Still referring to FIG. 3, FDD layer 216 is shown to include a stationary process detector 320. Stationary process detector 320 may use the confidence difference 318 to determine whether the control limits 314 can be fine-tuned to more precisely detect outliers in a stationary process. For example, stationary process detector 320 may compare the confidence difference 318 for the current training window with a first threshold value $thresh_1$ (e.g., 0.1). As mentioned above, the confidence difference 318 is expected to decrease as time elapses. Stationary process detector 318 may identify the time at which the confidence difference 318 drops below the first threshold value $thresh_1$ following a coarse retraining of the control limits 314. The time at which the confidence difference 318 drops below the threshold value $thresh_1$ is identified as the "reference time." The reference time corresponds to a particular training window and a particular confidence difference during that training window. At the reference time, control limit trainer 312 may retrain the control limits 314 and store the retrained control limits 314 in reference values database 324 as "reference control limits." The confidence difference at the reference time may also be stored in reference values database 324 as a "reference confidence difference."

Stationary process detector 320 may continue monitoring the confidence difference 318 after the reference values have been stored in reference values database 324. Stationary process detector 320 may identify the time at which the confidence difference 318 drops below a second threshold value $thresh_2$. In some embodiments, the second threshold value $thresh_2$ is a function of the reference confidence difference (e.g., approximately 5% of the reference confidence difference). In response to the confidence difference 318 dropping below the second threshold value $thresh_2$, stationary process detector 320 may provide a process stationary notification 342 to control limit trainer 312. Upon receiving the process stationary notification 342, control limit trainer 312 may fine-tune the control limits 314 to more precisely detect outliers in a stationary process.

In some embodiments, control limit trainer 312 uses the same or similar process to retrain the control limits 314 regardless of whether the retraining is classified as a "coarse retraining" or a "fine-tuning" However, a coarse retraining and a fine-tuning may occur in response to different events. For example, a coarse retraining of the control limits 314 may occur in response to control limit trainer 312 receiving the process change notification 340 from process change detector 328. When a coarse retraining occurs, the confidence period is reset and the error samples 306 prior to the coarse retraining are dropped, which causes the confidence difference 318 to increase. A fine-tuning of the control limits 314 may occur in response to control limit trainer 312 receiving the process stationary notification 342 from stationary process detector 320. When a fine-tuning occurs, the confidence period is not reset and the error samples 306 are not dropped. The confidence difference 318 may not increase after a fine-tuning, but rather may continue to decrease hyperbolically as more error samples 306 are obtained.

In some embodiments, stationary process detector 320 verifies that the active control limits 314 have not increased by more than a threshold amount (e.g., 10%) relative to the reference control limits before providing the process stationary notification 342. For example, stationary process detector 320 is shown receiving a notification 336 from control limit monitor 334 indicating that the active control limits 314 are within a threshold. Control limit monitor 334 may generate notification 336 in response to a determination that the active control limits 314 are within a widened set of threshold control limits. In some embodiments, the widened set of threshold control limits are approximately 10% wider than the reference control limits.

The active control limits 314 may have changed relative to the reference control limits due to control limit trainer 312 fine-tuning control limits 314 in response to a previous process stationary notification 342. If the active control limits 314 are within the threshold control limits, control limit monitor 334 may generate and output the "limits within threshold" notification 336. However, if the active control limits 314 are not within the threshold control limits, control limit monitor 334 may not generate and output notification 336. In some embodiments, stationary process detector 320 does not provide control limit trainer 312 with the process stationary notification 342 unless both notification 336 is received and the confidence difference 318 has dropped below the second threshold value $thresh_2$. These criteria for providing the process stationary notification 342 ensure that only a process change notification 340 can trigger the control limits 314 to be retrained if the controlled process is worsening (e.g., moving away from zero error) beyond the threshold control limits.

Referring now to FIGS. 4-7, several processes 400-700 for training and using outlier detection limits are shown, according to an exemplary embodiment. Processes 400-700 may be performed by BAS controller 72 using FDD layer 216 and the various components thereof, as described with reference to FIGS. 2-3. In brief overview, process 400 may be used to identify changes in a controlled system or process based on detected fault events and/or detected lower variance events. Process 500 may be used to detect when a controlled system or process stabilizes or becomes stationary by calculating a confidence difference and comparing the confidence difference to a threshold value. Process 600 may be used to train or retrain outlier detection limits in response to a determination that a controlled system or process has changed (e.g., using process 400) or in response to a determination that the controlled system or process has stabilized (e.g., using process 500). Process 700 illustrates a retraining process that may be performed by FDD layer 216 to detect outliers in performance data for a building management system and to adaptively retrain the control limits used for such outlier detection.

Figure 4:
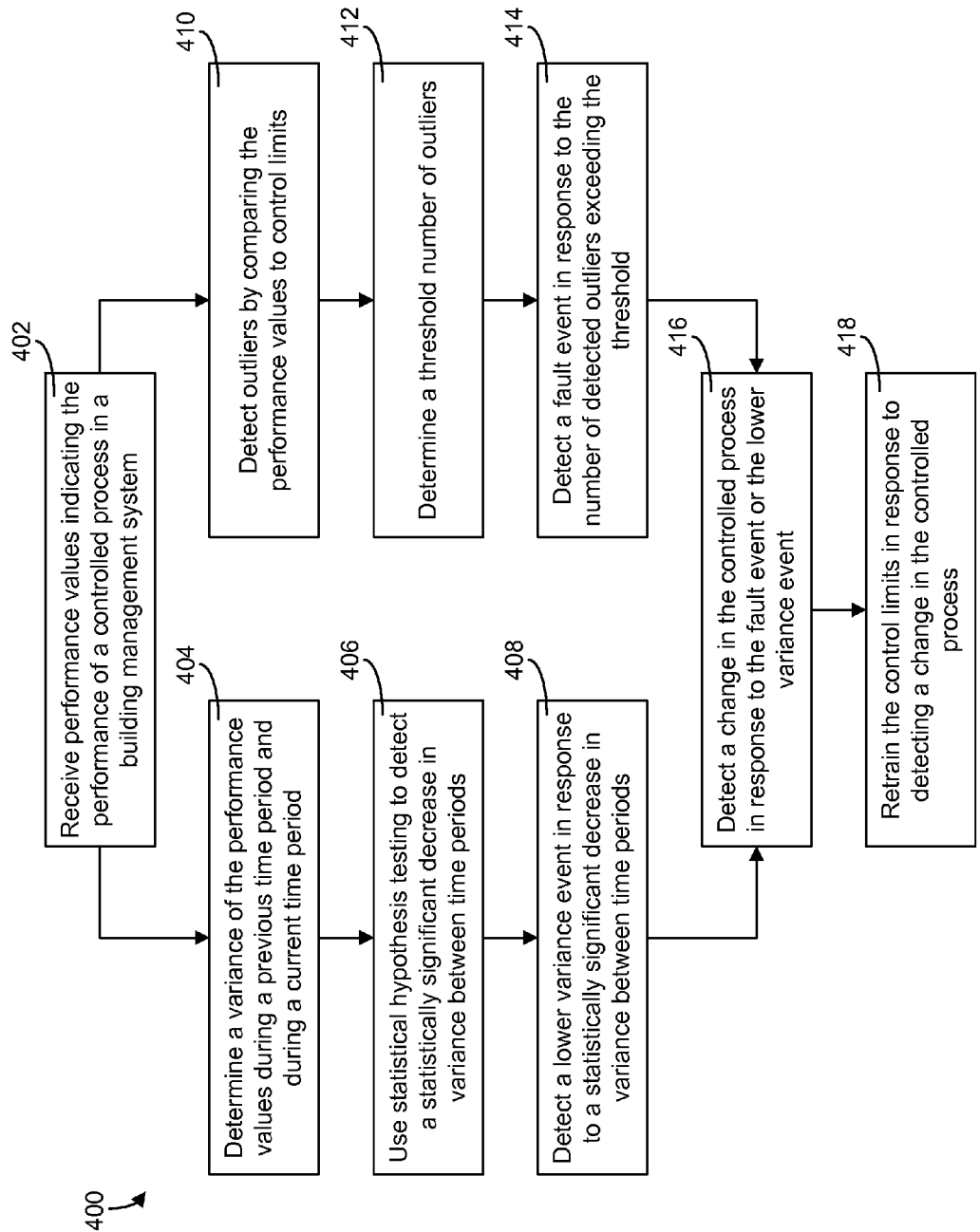
FIG. 4 is a flowchart of a process for detecting a change in a controlled system or process in a building automation system, according to an exemplary embodiment.

Referring particularly to FIG. 4, a flowchart of a process 400 for identifying changes in a controlled system or process based on detected fault events and/or detected lower variance events is shown, according to an exemplary embodiment. Process 400 is shown to include receiving performance values indicating the performance of a controlled process in a building management system (step 402). In some embodiments, the performance values are generated by building subsystems 228, as described with reference to FIG. 2. For example, building subsystems 228 may generate temporal (i.e., time-series) data indicating the performance of BAS 200 and the various components thereof. The data generated by building subsystems 228 may include measured or calculated values that exhibit statistical characteristics and provide information about how the corresponding system or process (e.g., a temperature control process, a flow control process, etc.) is performing in terms of error from its setpoint.

In some embodiments, the performance values received in step 402 are error values representing a difference between a setpoint r for the controlled process (e.g., a temperature control process, a humidity control process, a flow control process, etc.) and a measured or calculated value x for the controlled process. The measured or calculated value x may be measured by any of a variety of sensors of building subsystems 228 or calculated based on one or more measured values. For example, the value x may be a measured temperature, a measured humidity, a measured flow rate, a measured or calculated energy consumption, etc. The performance values may be calculated by subtracting the measured or calculated value x from the setpoint r (i.e., e=r−x, where e is the process error). In some embodiments, the performance values are average error values (e.g., strict averages, moving averages, weighted moving averages, exponentially-weighted moving averages, etc.) as described with reference to EWMA calculator 304.

Still referring to FIG. 4, process 400 is shown to include determining a variance of the performance values during a previous time period and during a current time period (step 404). The previous time period may be the training window that was used to determine the currently-active control parameters. In some embodiments, step 404 includes calculating the variance $S^2$ of the performance values in each time period using the equation:

$$S = \sqrt{\frac{1}{n-1}\sum_{i=1}^{n}[x(i)]^2}$$

where x is a vector containing the performance values from the applicable time period and n is the length of the vector. The result of this calculation S represents the standard deviation of the performance values and can be squared to determine the variance $S^2$. The variance of the performance values in the previous time period and the variance of the performance values in the current time period may be calculated independently using the performance values from the respective time periods.

Process 400 is shown to include using statistical hypothesis testing to detect a statistically significant decrease in variance between the previous time period and current time period (step 406). The statistical hypothesis testing performed in step 406 may include formulating a left-tailed hypothesis test of the form:

$$H_0: S_{CurrentPeriod}^2 \geq S_{PreviousPeriod}^2$$

$$H_1: S_{CurrentPeriod}^2 < S_{PreviousPeriod}^2$$

where $H_0$ is the null hypothesis that the variance of the performance values in the current time period (i.e., $S_{CurrentPeriod}^2$) is greater than or equal to the variance of the performance values in the previous time period (i.e., $S_{PreviousPeriod}^2$) and $H_1$ is the tested hypothesis that the variance $S_{CurrentPeriod}^2$ is less than the variance $S_{PreviousPeriod}^2$.

Step 406 may include using a two-sample F-test for variance to calculate the test statistic $F_{STAT}$:

$$F_{STAT} = \frac{S_{CurrentPeriod}^2}{S_{PreviousPeriod}^2} \sim F_{V_1, V_2}$$

where the parameter $V_1$ indicates the degrees of freedom of the numerator (i.e., the number of samples in the current time period minus one) and the parameter $V_2$ indicates the degrees of freedom of the denominator (i.e., the number of samples in the previous time period minus one).

Step 406 may include generating a critical value $f_{crit}$ for the test statistic. In some embodiments, the critical value $f_{crit}$ is generated using an inverse cumulative distribution function for the test statistic $F_{STAT}$. For example, step 406 may include calculating the critical value $f_{crit}$ using the following equation:

$$f_{crit} = F_{V_1, V_2}^{-1}(1-\alpha)$$

where $F^{-1}$ is the inverse cumulative distribution function for the test statistic and the parameter $\alpha$ represents the probability of a false positive for the statistical hypothesis test (i.e., the probability of incorrectly rejecting the null hypothesis when in fact $S_{CurrentPeriod}^2 \geq S_{PreviousPeriod}^2$). Step 406 may include determining the parameter $\alpha$ by identifying an acceptable probability that the null hypothesis will be incorrectly rejected. In various embodiments, a value for the parameter $\alpha$ may be retrieved from memory, specified by a user, and/or calculated based on one or more stored values. In an exemplary embodiment, the value for the parameter $\alpha$ is approximately 0.001.

Step 406 may include comparing the critical value $f_{crit}$ with the test statistic $F_{STAT}$ to determine whether to reject the null hypothesis. If the value of the test statistic is less than the critical value (i.e., $F_{STAT} < f_{crit}$), step 406 may include rejecting the null hypothesis and determining that a statistically significant decrease in variance has occurred. However, if the value of the test statistic is not less than the critical value (i.e., $F_{STAT} \geq f_{crit}$), step 406 may include determining that a statistically significant decrease in variance has not occurred.

Process 400 is shown to include detecting a lower variance event in response to a statistically significant decrease in variance between the previous and current time periods (step 408). Step 408 may include determining whether the null hypothesis is rejected in step 406. If the null hypothesis is rejected, step 408 may include generating and outputting a lower variance event notification indicating that a lower variance event has occurred.

Still referring to FIG. 4, process 400 is shown to include detecting outliers by comparing the performance values to control limits (step 410). Step 410 may include comparing each of the performance values with the current control limits to determine whether any of the performance values qualify as an outlier. For example, if a performance value is within a range of values defined by the control limits, step 410 may determine that the performance value is not an outlier. However, if the performance value lies outside the range of values defined by the control limits, step 410 may determine that the performance value qualifies as an outlier.

Process 400 is shown to include determining a threshold number of outliers (step 412). The threshold number of outliers may be a criterion for detecting a fault event. For example, if the number of outliers detected during a particular time period exceeds the threshold number of outliers, process 400 may determine that a fault event has occurred. In some embodiments, the threshold number of outliers is time period-specific. For example, the threshold number of outliers may be a function of the maximum confidence parameter $\hat{p}_{max}$ for the time period.

In some embodiments, step 412 includes calculating the fault event threshold using an inverse binomial function $B^{-1}(\alpha, n, \hat{p}_{max})$. The function $B^{-1}$ returns a threshold number of outliers x as a function of the parameters $\alpha$, n, and $\hat{p}_{max}$ such that the binomial cumulative distribution function of n performance values evaluated at x is at least $\alpha$, given that each performance value has a probability $\hat{p}_{max}$ of being an outlier. In other words, the parameter $\alpha$ is the probability of observing x outliers in a sample size of n where each performance value has a probability $\hat{p}_{max}$ of being an outlier. The parameter $\alpha$ may be specified by a user, retrieved from memory, or automatically determined. The parameter n may be equal to the number of performance values in the time period used to establish the control limits. The parameter $\hat{p}_{max}$ may be determined as described with reference to confidence difference calculator 308.

Process 400 is shown to include detecting a fault event in response to the number of detected outliers exceeding the threshold (step 414). Step 414 may include comparing the number of outliers detected in step 410 with the threshold number of outliers detected in step 412. When the number of detected outliers exceeds the threshold, process 400 may output a fault event notification indicating that a change in the controlled process has occurred.

Still referring to FIG. 4, process 400 is shown to include detecting a change in the controlled process in response to the fault event or the lower variance event (step 416) and retraining the control limits in response to detecting a change in the controlled process (step 418). Advantageously, both the fault event detected using steps 404-408 and the lower variance event detected using steps 410-414 may cause a change in the controlled process to be detected in step 416. This functionality allows the control limits to be widened in response to fault events (e.g., to compensate for an increase in process variance and/or steady-state error) and subsequently narrowed in response to a decreased process variance (e.g., to provide more accurate outlier detection once the process has settled). Step 418 may be accomplished by performing process 600, as described with reference to FIG. 6.

Referring now to FIG. 5, a flowchart of a process 500 for detecting a stationary process is shown, according to an exemplary embodiment. In some embodiments, process 500 is performed by confidence difference calculator 308 and stationary process detector 320, as described with reference to FIG. 3. Process 500 is shown to include counting a number of samples n and a number of outliers $n_o$ in a confidence period (step 502) and estimating confidence parameters $\hat{p}$ for a training window of the confidence period (step 504). The samples n may be the performance values received in step 402 of process 400. The number of outliers $n_o$ may be the number of performance values that qualify as outliers, as determined in step 410 of process 400. The confidence period defines the period of time used to calculate the estimated confidence parameters $\hat{p}$. The confidence period begins when a coarse retraining of the control limits is performed and lasts until the next coarse retraining. A confidence period may include one or more training windows.

The estimated confidence parameters $\hat{p}$ may be determined according to the following equation:

$$\hat{p} = \frac{n_o}{n}$$

where n is the total number of samples in the confidence period and $n_o$ is the number of samples that qualify as outliers in the confidence period. Each time a new sample is obtained, a new value for the estimated confidence parameter $\hat{p}$ may be calculated. Each value of the estimated confidence parameter $\hat{p}$ may correspond to a particular moment in time. As time elapses during the confidence period, more performance values are obtained and the estimated confidence parameter $\hat{p}$ decreases hyperbolically. When a coarse retraining of the control limits is performed, the current confidence period ends and a new confidence period begins. When a new confidence period begins, the total number of samples n and outlier samples $n_o$ may be reset.

Process 500 is shown to include identifying a maximum confidence parameter $\hat{p}_{max}$ and a minimum confidence parameter $\hat{p}_{min}$ for the training window (step 506) and calculating a confidence difference $\Delta\hat{p}$ for the training window (step 508). The training window may be a portion of the confidence period and may define a period of time used to calculate the confidence difference. The confidence difference may be calculated by subtracting the minimum confidence parameter $\hat{p}_{min}$ for the training window from the maximum confidence parameter $\hat{p}_{max}$ for the (i.e., $\Delta\hat{p}=\hat{p}_{max}-\hat{p}_{min}$). The confidence parameter $\hat{p}$ may decrease hyperbolically with time, which causes the confidence difference to decrease with each successive training window.

Still referring to FIG. 5, process 500 is shown to include detecting a stationary process by comparing the confidence difference to a threshold value (step 510). Step 510 may be used to determine whether the control limits can be fine-tuned to more precisely detect outliers in a stationary process. In some embodiments, step 510 includes comparing the confidence difference calculated in step 508 with a first threshold value $thresh_1$ (e.g. 0.1). As mentioned above, the confidence difference is expected to decrease as time elapses. Step 510 may include identifying the time at which the confidence difference drops below the first threshold value $thresh_1$ following a coarse retraining of the control limits (i.e., the "reference time" as described with reference to FIG. 3). At the reference time, the control limits may be retrained and stored as "reference control limits." The confidence difference at the reference time may also be stored as a "reference confidence difference."

In some embodiments, step 510 includes continuing to monitor the confidence difference after the reference values have been stored. Step 510 may include identifying the time at which the confidence difference drops below a second threshold value $thresh_2$. In some embodiments, the second threshold value $thresh_2$ is a function of the reference confidence difference (e.g., approximately 5% of the reference confidence difference). Step 510 may include detecting a stationary process in response to the confidence difference dropping below the second threshold value $thresh_2$. Upon detecting a stationary process, the control limits may be retrained to more precisely detect outliers in the stationary process (step 512). Step 512 may be accomplished by performing process 600, as described with reference to FIG. 6.

In some embodiments, process 500 includes verifying that the active control limits have not increased by more than a threshold amount (e.g., 10%) relative to the reference control limits before retraining the control limits in step 512. For example, step 512 may include determining whether the active control limits are within a widened set of threshold control limits. In some embodiments, the widened set of threshold control limits are approximately 10% wider than the reference control limits. The active control limits may have changed relative to the reference control limits due to the retraining that occurs in a previous iteration of process 500. If the active control limits are within the threshold control limits, the control limits may be retrained in step 512. However, if the active control limits are not within the threshold control limits, the control limits may not be retrained in step 512. These criteria for retraining the control limits in process 500 ensure that only a change in the controlled process (as detected by process 400) can trigger the control limits to be retrained if the controlled process is worsening (e.g., moving away from zero error) beyond the threshold control limits.

Referring now to FIG. 6, a flowchart of a process 600 for retraining control limits is shown, according to an exemplary embodiment. In some embodiments, process 600 is performed by control limit trainer 312, as described with reference to FIG. 3. Process 600 may be triggered in response to detecting a change in the underlying controlled process (e.g., using process 400) and/or in response to detecting a stationary process (e.g., using process 500). The control limits generated by process 600 may be based on the statistics of the underlying process. For example, process 600 is shown to include receiving performance values indicating the performance of a controlled process in a building management system (step 602). The performance values received in step 602 may be the same or similar to the performance values described in step 402 of process 400 (e.g., error samples, EWMA values, etc.).

Process 600 is shown to include calculating a target parameter μ and an estimator of scale σ for the performance values (step 604). The target parameter μ may be the mean of the performance values. The estimator of scale σ may be a metric that describes how spread out the set of performance values is relative to the target parameter. In one embodiment, the standard deviation of the performance values is used as the estimator of scale σ. In other embodiments, a robust estimator of scale may be calculated based on the performance values (as described with reference to control limit trainer 312) and used as the estimator of scale σ.

Process 600 is shown to include generating initial control limits (step 606). The initial control limits may be calculated as shown in the following equations:

$$UCL=\mu+K\sigma$$

$$LCL=\mu-K\sigma$$

$$CL=\mu$$

where UCL is defined as an upper control limit, LCL is a lower control limit, and CL is a center limit. The center limit CL may be equal to a target parameter μ. The upper and lower control limits may be equal to the target parameter μ plus or minus a multiple K of the estimator of scale σ. In one embodiment, the multiplier K is approximately 2.8. Such a multiplier captures approximately 99% of the performance values within the control limits UCL and LCL.

Process 600 is shown to include identifying an outer control limit (step 608) and adjusting the initial control limits (step 610). The outer control limit OL may be defined as the maximum of the absolute values of UCL and LCL (i.e., OL=max(|UCL|, |LCL|). Step 610 may include setting the center limit CL equal to and redefining the control limits as shown in the following equations:

$$UCL'=OL$$

$$LCL'=-OL$$

$$CL'=0$$

The upper control limit may be equal to the outer control limit OL and the lower control limit may be equal to the negative outer limit −OL. This ensures that the adjusted control limits (i.e., UCL' and LCL') are centered around zero and allow the controlled process to move toward zero error without producing outliers.

Process 600 is shown to include using the adjusted control limits to detect outliers (step 612). Step 612 may include comparing each of the performance values with the adjusted control limits to determine whether any of the performance values qualify as an outlier. For example, if a performance value is within a range of values defined by the adjusted control limits, step 612 may determine that the performance value is not an outlier. However, if the performance value lies outside the range of values defined by the control limits, step 612 may determine that the performance value qualifies as an outlier.

Figure 7:
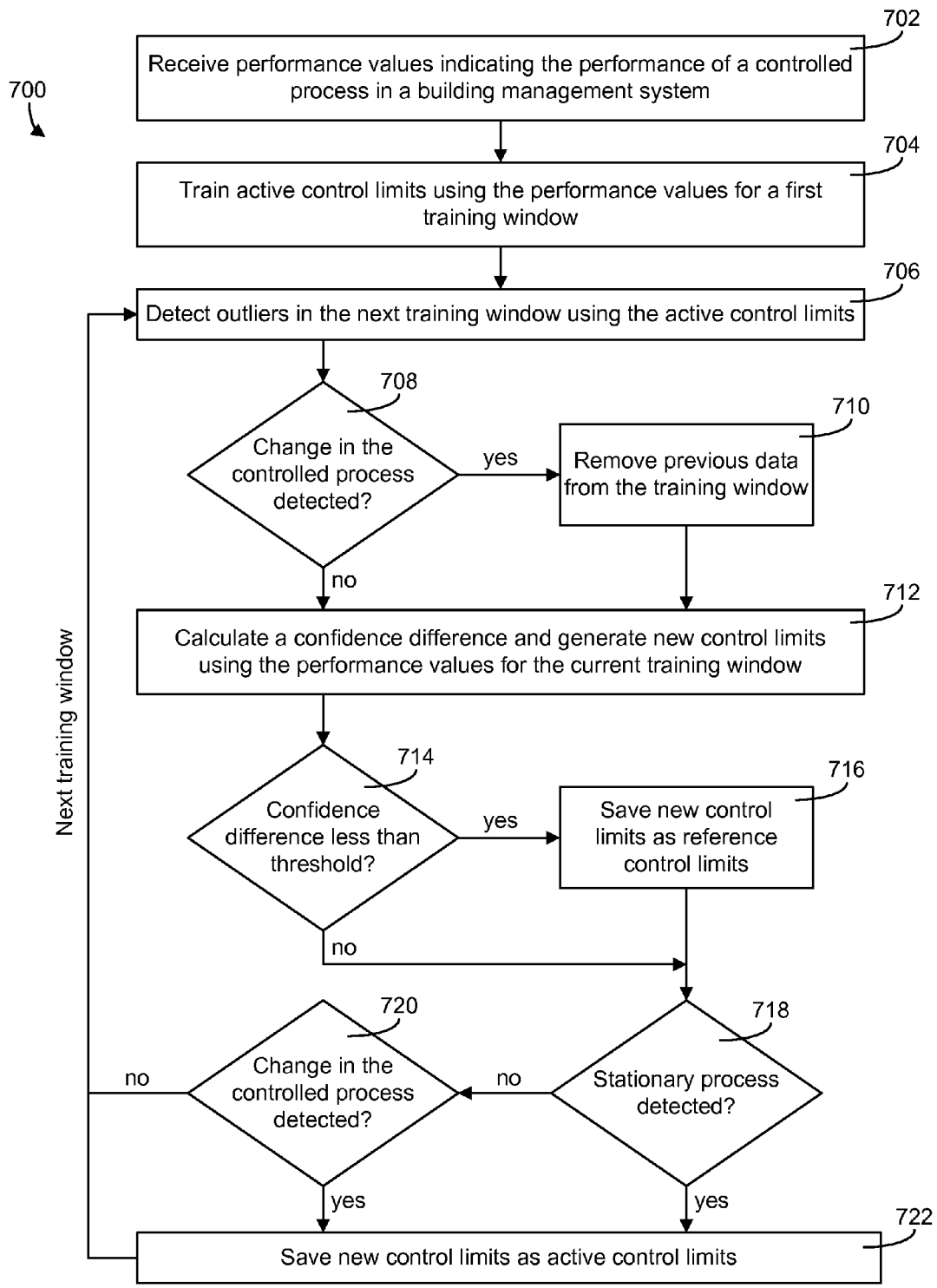
FIG. 7 is a flowchart of a process integrating the processes of FIGS. 4-6 and illustrating a method for retraining outlier detection limits in a building management system, according to an exemplary embodiment.

Referring now to FIG. 7, a flowchart of a process 700 for retraining outlier detection limits in a building management system is shown, according to an exemplary embodiment. Process 700 illustrates a series of steps that may be performed by FDD layer 216 to detect outliers in performance data for the building management system and to adaptively retrain the control limits used for such outlier detection. Process 700 integrates many of the functions and process steps described with reference to FIGS. 2-6 and provides an overview of an exemplary retraining process in accordance with the present invention.

Process 700 is shown to include receiving performance values indicating the performance of a controlled process in a building management system (step 702) and training active control limits using the performance values for a first training window (step 704). The performance values received in step 702 may be the same or similar to the performance values described in step 402 of process 400 (e.g., error samples, EWMA values, etc.). Training the active control limits in step 704 may be accomplished by performing process 600, as described with reference to FIG. 6, using the performance values corresponding to the first training window.

Process 700 is shown to include detecting outliers in the next training window using the active control limits (step 706). Step 706 may be performed by comparing the performance values from a subsequent training window to the control limits established in step 704. Step 706 may include comparing each of the performance values with the adjusted control limits to determine whether any of the performance values qualify as an outlier. For example, if a performance value is within a range of values defined by the adjusted control limits, step 706 may determine that the performance value is not an outlier. However, if the performance value lies outside the range of values defined by the control limits, step 706 may determine that the performance value qualifies as an outlier.

Still referring to FIG. 7, process 700 is shown to include determining whether change in the controlled process has been detected (step 708). Step 708 may be performed by process change detector 328 and may be accomplished by performing process 400. The change in the controlled process may be a fault event or lower variance event. If a change in the controlled process has been detected (i.e., the result of step 708 is "yes"), process 700 may proceed to remove previous data from the training window (step 710). Step 710 may include discarding the performance values and saved parameters (e.g., confidence difference, number of samples n, number of outliers $n_o$, etc.) corresponding to times prior to the detected change in the controlled process.

Process 700 is shown to include calculating a confidence difference and generating new control limits using the performance values for the current training window (step 712). Step 712 may be performed in response to a determination in step 708 that a change in the controlled process has not been detected (i.e., the result of step 708 is "no") and/or after performing step 710. Calculating the confidence difference may be accomplished by performing step 508 of process 500. For example, calculating the confidence difference may include estimating confidence parameters $\hat{p}$ for the training window $$\left(\hat{p} = \frac{n_o}{n}\right)$$

and subtracting the minimum confidence parameter $\hat{p}_{min}$ for the training window from the maximum confidence parameter $\hat{p}_{max}$ for the (i.e., confidence difference=$\hat{p}_{max}-\hat{p}_{min}$). Generating new control limits for the training window may be accomplished by performing process 600.

Process 700 is shown to include determining whether the confidence difference is less than a threshold (step 714). In some embodiments, the threshold is approximately 0.1. The threshold in step 714 may be the first threshold $thresh_1$ described with reference to stationary process detector 320. If the confidence difference is less than the threshold (i.e., the result of step 714 is "yes"), process 700 may proceed to saving the new control limits as reference limits (step 716). In some embodiments, step 716 includes storing the control limits calculated in step 712 in reference values database 324. Step 716 may further include storing the confidence difference generated in step 712 in reference values database 324.

Process 700 is shown to include determining whether a stationary process has been detected (step 718). Step 718 may be performed in response to a determination in step 714 that the confidence difference is not less than the threshold (i.e., the result of step 714 is "no") and/or after performing step 716. Step 718 may be performed by stationary process detector 320 and may be accomplished by performing process 500. If a stationary process has not been detected (i.e., the result of step 718 is "no"), process 700 may proceed to determining whether a change in the controlled process has been detected (step 720). Step 720 may be the same or similar to step 708.

If a stationary process has been detected (i.e., the result of step 718 is "yes") and/or a change in the controlled process has been detected (i.e., the result of step 720 is "yes"), process 700 may proceed to saving the new control limits as active control limits (step 722). Step 722 may include updating the control limits actively used by outlier detector 310 to detect outliers. The active control limits may be replaced with the new control limits calculated in step 712. After the new control limits have been saved as the active control limits and/or if the result of step 720 is "no," process 700 may advance to the next training window and repeat steps 706-722 iteratively.

Figure 8:
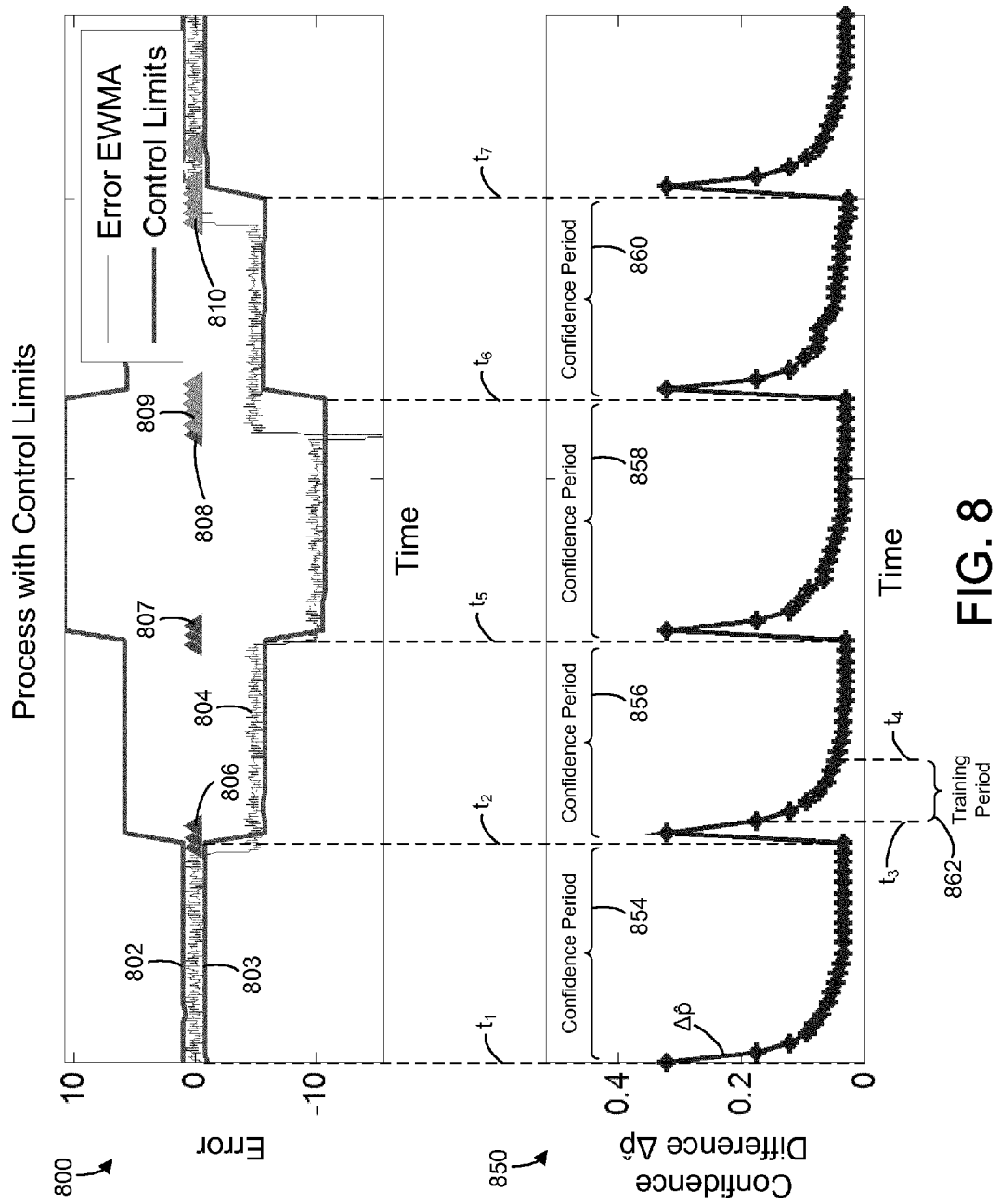
FIG. 8 is a pair of graphs illustrating the performance of the current invention to adaptively retrain outlier detection limits based on detected changes in a controlled process and to fine-tune the outlier detection limits when the process has stabilized, according to an exemplary embodiment.

Referring now to FIG. 8, a pair of graphs 800 and 850 illustrating the performance of the present invention is shown, according to an exemplary embodiment. Graph 800 plots the value of a performance metric 804 (e.g., EWMA of process error) characterizing the performance of a controlled process as a function of time. Also shown in graph 800 are the control limits 802-803 for the process as a function of time. Control limit 802 is the upper control limit and control limit 803 is the lower control limit. Control limits 802-803 may be calculated by control limit trainer 312, as described with reference to FIG. 3. As shown in FIG. 8, control limits 802 and 803 are symmetric relative to zero error (i.e., offset from zero error by the same amount in the positive direction and negative direction).

Graph 850 plots the value of the confidence difference $\Delta\hat{p}$ for the controlled process as a function of time. Confidence difference $\Delta\hat{p}$ may be updated each time a new sample of performance metric 804 is obtained based on the maximum and minimum confidence parameter values (i.e., $\hat{p}_{max}$ and $\hat{p}_{min}$) within a predetermined training period. For example, the confidence parameter $\hat{p}$ may be updated each time a new sample of performance metric 804 is obtained. In some embodiments, confidence parameter $\hat{p}$ is a Bernoulli parameter and may be calculated by confidence difference calculator 308, as described with reference to FIG. 3

$$\left(\text{e.g., } \hat{p} = \frac{n_o}{n}\right).$$

At the end of each training period, confidence difference calculator 308 may identify the maximum confidence parameter $\hat{p}_{max}$ and minimum confidence parameter $\hat{p}_{min}$ during the training period. For example, at time $t_4$ shown in FIG. 8, confidence difference calculator 308 may identify the maximum confidence parameter $\hat{p}_{max}$ and minimum confidence parameter $\hat{p}_{min}$ during training period 862. The difference between the identified values (i.e., $\hat{p}_{max}-\hat{p}_{min}$) may be recorded as the confidence difference $\Delta\hat{p}$ at time $t_4$.

Graph 850 is shown to include several confidence periods 854, 856, 858, and 860. Each of confidence periods 854-860 begins when a coarse retraining of control limits 802-803 is performed and lasts until the next coarse retraining. As shown in FIG. 8, a coarse retraining of control limits 802-803 is performed at times $t_1$, $t_2$, $t_5$, $t_6$, and $t_7$. Confidence period 854 begins at time $t_1$ and ends at time $t_2$. Confidence period 856 begins at time $t_2$ and ends at time $t_5$. Confidence period 858 begins at time $t_5$ and ends at time $t_6$. Confidence period 860 begins at time $t_6$ and ends at time $t_7$. At the beginning of each confidence period 854-860, the number of detected outliers $n_o$ and total number of samples n of performance metric 804 may be reset, which causes confidence parameter $\hat{p}$ to increase. As more samples of performance metric 804 are obtained (i.e., as n increases), the confidence parameter $\hat{p}$ may decrease hyperbolically until the beginning of the next confidence period. As the confidence parameter $\hat{p}$ stabilizes, the confidence difference $\Delta\hat{p}$ may decrease throughout each confidence period, as shown in FIG. 8.

Graph 850 is shown to include a training period 862. Training period 862 begins at time $t_3$ and ends at time $t_4$. Although only one training period 862 is shown in graph 850, it is understood that any number of discrete (e.g., consecutive) or overlapping training periods may exist. In some embodiments, each training period has a duration of one day. Confidence difference $\Delta\hat{p}$ may be calculated for each training period (e.g., at the end of the training period) based on the maximum and minimum confidence parameters $\hat{p}$ that occur within that training period. For example, the confidence difference $\Delta\hat{p}$ at time $t_4$ may be the difference between the maximum confidence parameter $\hat{p}_{max}$ and the minimum confidence parameter $\hat{p}_{min}$ that occur between times $t_3$ and $t_4$. As the training period shifts forward in time, the confidence difference $\Delta\hat{p}$ may be updated based on the set of confidence parameter values that correspond to the times within the shifted training period.

At time $t_1$, performance metric 804 has an average value of approximately 0 and a low variance. Control limits 802-803 are sufficiently narrow to precisely detect outliers at time $t_1$. As shown in FIG. 8, control limits 802-803 have values of approximately 1 and −1 at time $t_1$. Shortly before time $t_2$, the controlled process measured by performance metric 804 changes, which causes the average value of performance metric 804 to change to approximately −5. Outliers 806 are detected in response to performance metric 804 lying outside control limits 802-803. Each new sample of performance metric 804 that lies outside control limits 802-803 is detected as an outlier 806.

At time $t_2$, the number of detected outliers 806 exceeds a threshold number of outliers and a fault event is identified. In response to the fault event, control limits 802-803 are retrained at time $t_2$. This retraining is a coarse retraining which causes confidence parameter $\hat{p}$ to be reset. Confidence parameter $\hat{p}$ decreases hyperbolically following time $t_2$, which causes the confidence difference $\Delta\hat{p}$ to drop below a first threshold value (e.g., approximately 0.1) at time $t_3$. The values of control limits 802-803 at time $t_3$ are stored as "reference control limits." The value of the confidence difference $\Delta\hat{p}$ at time $t_3$ is also stored as a "reference confidence difference."

At time $t_4$, the confidence difference $\Delta\hat{p}$ drops below a second threshold value as the confidence parameter $\hat{p}$ continues to stabilize. In some embodiments, the second threshold value is approximately 5% of the first threshold value. In response to the confidence difference $\Delta\hat{p}$ dropping below the second threshold value, control limits 802-803 are retrained. This retraining is a fine-tuning which does not cause confidence parameter $\hat{p}$ to be reset. The fine-tuning does, however, adjust the active control limits 802-803 to more precisely detect outliers in performance metric 804. Control limits 802-803 may be periodically adjusted via fine-tuning until the next coarse retraining at time $t_5$. In some embodiments, control limits 802-803 may be prevented from widening past 110% of the reference control limits set at time $t_3$ via fine-tuning.

At time $t_5$, control limits 802-803 are retrained. This retraining is a coarse retraining which causes confidence parameter $\hat{p}$ to be reset. Confidence parameter $\hat{p}$ decreases hyperbolically following time $t_5$. Control limits 802-803 may be fine-tuned between times $t_5$ and $t_6$ as previously described.

Shortly before time $t_6$, a single outlier 808 is detected. However, because the number of detected outliers within that training period is less than the threshold number of outliers, a fault event is not identified. The average value of performance metric 804 then changes to approximately −5, which causes the variance of performance metric 804 to decrease relative to zero error. Lower variance events 809 are generated in response to the decrease in process variance. In response to lower variance events 809, control limits 802-803 are retrained at time $t_6$. This retraining is a coarse retraining which causes confidence parameter $\hat{p}$ to be reset. Confidence parameter $\hat{p}$ decreases hyperbolically following time $t_6$. Control limits 802-803 may be fine-tuned between times $t_6$ and $t_7$ as previously described.

Shortly before time $t_7$, the average value of performance metric 804 changes to approximately 0, which causes the variance of performance metric 804 to decrease relative to zero error. Lower variance events 810 are generated in response to the decrease in process variance. In response to lower variance events 810, control limits 802-803 are retrained at time $t_7$. This retraining is a coarse retraining which causes confidence parameter $\hat{p}$ to be reset. Confidence parameter $\hat{p}$ decreases hyperbolically following time $t_7$. Control limits 802-803 may be fine-tuned following time $t_7$ as previously described.

Advantageously, the systems and methods of the present invention allow the control limits 802-803 to be widened in response to detected fault events and subsequently narrowed in response to decreased process variance. The decreased process variance is detected using statistical hypothesis testing by comparing the variance of the process error during a current time period to the variance of the process error during a previous time period. Both detected fault events and decreases in process variance cause a coarse retraining of control limits 802-803.

Following a coarse retraining of control limits 802-803, the confidence difference is monitored relative to a first threshold value. The time at which the confidence difference drops below the first threshold value is referred to as the reference time. The values of control limits 802-803 at the reference time are stored as reference control limits. The confidence difference is monitored following the reference time to determine when the confidence difference drops below a second threshold value (e.g., 5% of the first threshold value). When the confidence difference drops below the second threshold value, control limits 802-803 are fine-tuned to more precisely detect outliers in a stationary process. Control limits 802-803 may be periodically adjusted via fine-tuning until the next coarse retraining. However, control limits 802-803 may be prevented from widening past 110% of the reference control limits via fine-tuning.

In some embodiments, the outlier detection and/or control limit retraining processes described herein are performed by a controller in a building management system (BMS). The controller may exist at any level in the BMS. For example, the controller may be a low level controller for a particular article of building equipment or collection of building equipment (e.g., a chiller controller, a zone temperature controller, an AHU controller, etc.), a subsystem level controller that controls a building subsystem (e.g., a HVAC controller), a supervisory controller that supervises and/or controls multiple building subsystems (e.g., a BMS controller such as a METASYS® brand controller sold by Johnson Controls), a cloud-based controller or control system that supervises and/or controls multiple facilities or building automation systems (e.g., a PANOPTIX® brand building efficiency platform sold by Johnson Controls), or any other type of controller or system that receives and processes BMS data.

In some embodiments, the controller interacts with building equipment in the BMS. For example, the controller may provide a control signal to the building equipment (e.g., an on/off command, an operating setpoint, etc.) that affects the operation of the building equipment. The controller may receive a feedback signal from the building equipment (e.g., a measured or calculated value) that represents a variable of interest in a controlled process (e.g., temperature, energy consumption, etc.). In other embodiments, the controller is a system or device that receives and processes BMS data without actively providing control signals to the building equipment. For example, the controller may be a component of an outlier detection system that analyzes current or historical performance values from the BMS. It is contemplated that the controller may be any system or device that uses performance values to detect outliers and/or retrain outlier detection limits, with or without active control over building equipment.

In some embodiments, the performance values are time series values indicating the performance of the BMS or a component thereof. The performance values may be calculated based on feedback signals received from the building equipment. For example, the performance values may be error values or EWMA values based on a difference between a setpoint r for a controlled process (e.g., a temperature control process, a humidity control process, a flow control process, etc.) and a measured or calculated value x for the controlled process. In other embodiments, the performance values may represent time series values for any other measured or calculated variable having a zero mean or non-zero mean. It is contemplated that the systems and methods of the present invention may be used to detect outliers and/or retrain outlier detection limits for any stationary signal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   one or more sensors that measure a variable state or condition representing an output of a controlled process in the building management system;
   building equipment that operate to affect the variable state or condition of a building environment measured by the one or more sensors; and
   a controller in communication the building equipment and the one or more sensors, wherein the controller:
      provides a control signal to the building equipment, the control signal causing the building equipment to operate to affect the variable state or condition of the building environment measured by the one or more sensors;
      monitors performance values for the controlled process during a first time period relative to initial outlier detection limits;
      generates new outlier detection limits for the controlled process in response to a detected change in the controlled process during the first time period;
      outputs a user alert message comprising a fault event notification in response to the detected change in the controlled process;
      monitors the performance values relative to the new outlier detection limits during a second time period to detect outliers during the second time period;
      calculates a confidence difference for an estimated confidence parameter based on a number of outliers detected using the new outlier detection limits during the second time period, wherein the estimated confidence parameter is a ratio of a number of outliers detected during the second time period to a number of the performance values observed during the second time period; and
      adjusts the new outlier detection limits in response to the confidence difference dropping below a threshold value.

2. The building management system of claim 1, wherein calculating the confidence difference comprises:
   generating an estimated confidence parameter for each of the performance values observed during the second time period;
   identifying a maximum and a minimum of the generated confidence parameters; and calculating the confidence difference by subtracting the minimum confidence parameter from the maximum confidence parameter.

3. The building management system of claim 1, wherein in response to detecting the change in the controlled process, the controller resets the confidence difference and discards any performance values used to calculate the confidence difference prior to the detected change.

4. The building management system of claim 1, wherein adjusting the new outlier detection limits comprises:
identifying a reference time at which the confidence difference drops below a first threshold value;
storing the confidence difference at the reference time as a reference confidence difference; and
adjusting the new outlier detection limits in response to the confidence difference dropping below a second threshold value, wherein the second threshold value is a function of the reference confidence difference.

5. The building management system of claim 1, wherein adjusting the new outlier detection limits comprises:
identifying a reference time at which the confidence difference drops below a first threshold value;
storing the outlier detection limits at the reference time as reference outlier detection limits; and
maintaining the new outlier detection within a widened set of outlier detection limits based on the reference outlier detection limits.

6. The building management system of claim 1, wherein the performance values are process errors based on a difference between the output of the controlled process and a setpoint for the controlled process.

7. The building management system of claim 6, wherein the performance values are exponentially-weighted moving averages of the process errors.

8. The building management system of claim 1, wherein monitoring the performance values during the first time period comprises:
detecting outliers during the first time period using the initial outlier detection limits; and
detecting the change in the controlled process in response to a number of outliers detected during the first time period exceeding an outlier threshold.

9. The building management system of claim 8, wherein the controller calculates the outlier threshold as a function of the confidence difference.

10. The building management system of claim 1, wherein monitoring the performance values during the first time period comprises:
determining a current variance of the performance values during the first time period;
determining a previous variance of the performance values during a previous time period prior to the first time period; and
using the current variance of the performance values and the previous variance of the performance values to detect the change in the controlled process.

11. The building management system of claim 10, wherein detecting the change in the controlled process comprises:
using the current variance of the performance values and the previous variance of the performance values to generate a test statistic;
comparing the test statistic with a critical value; and
detecting the change in the controlled process in response to the critical value exceeding the test statistic.

12. A controller in a building management system, the controller comprising:

a communications interface that receives performance values indicating the performance of a controlled process in the building management system, and provides control signals to building equipment, the control signals causing the building equipment to operate to affect the controlled process;
an outlier detector that monitors performance values for the controlled process during a first time period relative to initial outlier detection limits and outputs a user alert message comprising a fault event notification in response to a detected change in the controlled process;
a control limit trainer that generates new outlier detection limits in response to the detected change in the controlled process during the first time period, wherein the outlier detector monitors the performance values relative to the new outlier detection limits during a second time period to detect outliers during the second time period;
a confidence difference calculator that calculates a confidence difference for an estimated confidence parameter based a number of outliers detected using the new outlier detection limits during the second time period; and
a stationary process detector that detects when the confidence difference drops below a threshold value during the second time period, wherein the control limit trainer adjusts the new outlier detection limits in response to the confidence difference dropping below the threshold value;
wherein the confidence difference calculator generates an estimated confidence parameter for each of the performance values observed during the second time period, and the confidence parameter is a ratio of a number of outliers detected during the second time period to a number of the performance values observed during the second time period.

13. The controller of claim 12, wherein the confidence difference calculator:
identifies a maximum and a minimum of the generated confidence parameters; and
calculates the confidence difference by subtracting the minimum confidence parameter from the maximum confidence parameter.

14. The controller of claim 12, wherein the outlier detector detects outliers during the first time period using the initial outlier detection limits;
the controller further comprising a process change detector that detects the change in the controlled process in response to a number of outliers detected during the first time period exceeding an outlier threshold.

15. The controller of claim 12, further comprising a lower variance detector that determines a current variance of the performance values during the first time period and determines a previous variance of the performance values during a previous time period prior to the first time period;
the controller further comprising a process change detector that uses the current variance of the performance values and the previous variance of the performance values to detect the change in the controlled process.

16. The controller of claim 15, wherein the lower variance detector:
uses the current variance of the performance values and the previous variance of the performance values to generate a test statistic;
compares the test statistic with a critical value; and
identifies a lower variance event in response to the critical value exceeding the test statistic;

wherein the process change detector detects the change in the controlled process in response to the lower variance event.

17. The controller of claim 12, wherein the performance values are exponentially-weighted moving averages of a process error, wherein the process error is a difference between an output of the controlled process and a setpoint for the controlled process.

18. The controller of claim 12, wherein in response to detecting the change in the controlled process, the confidence difference calculator resets the confidence difference and discards any performance values used to calculate the confidence difference prior to the detected change.

19. The controller of claim 12, wherein adjusting the new outlier detection limits comprises:
   identifying a reference time at which the confidence difference drops below the threshold value;
   storing the outlier detection limits at the reference time as reference outlier detection limits; and
   maintaining the new outlier detection within a widened set of outlier detection limits based on the reference outlier detection limits.

\* \* \* \* \*